United States Patent
Choi et al.

(10) Patent No.: US 11,179,749 B2
(45) Date of Patent: Nov. 23, 2021

(54) INTERPOSER, ULTRASOUND PROBE USING THE SAME, AND METHOD OF MANUFACTURING INTERPOSER

(71) Applicants: SAMSUNG ELECTRONICS CO., LTD., Suwon-si (KR); Dong Won Shin, Incheon (KR)

(72) Inventors: Kyung-moo Choi, Yongin-si (KR); Dong Won Shin, Incheon (KR)

(73) Assignees: SAMSUNG ELECTRONICS CO., LTD., Suwon-si (KR); Dong Won Shin, Incheon (KR)

( * ) Notice: Subject to any disclaimer, the term of this patent is extended or adjusted under 35 U.S.C. 154(b) by 717 days.

(21) Appl. No.: 16/038,875

(22) Filed: Jul. 18, 2018

(65) Prior Publication Data

US 2019/0022701 A1    Jan. 24, 2019

(30) Foreign Application Priority Data

Jul. 18, 2017    (KR) .................. 10-2017-0091050

(51) Int. Cl.
  *B06B 1/06*      (2006.01)
  *G01S 15/89*     (2006.01)
  *G01S 7/52*      (2006.01)

(52) U.S. Cl.
  CPC .......... *B06B 1/0677* (2013.01); *B06B 1/0622* (2013.01); *G01S 7/52079* (2013.01);
  (Continued)

(58) Field of Classification Search
  CPC ... B06B 1/0603; B06B 1/0607; B06B 1/0622; B06B 1/0677
  (Continued)

(56) References Cited

U.S. PATENT DOCUMENTS 5,329,498 A  *  7/1994  Greenstein ............ B06B 1/0629
                                                            310/327
6,043,590 A     3/2000  Gilmore
(Continued)

FOREIGN PATENT DOCUMENTS

CN     101278478 A    10/2008
CN     104337547 A     2/2015
(Continued)

OTHER PUBLICATIONS

Communication dated Dec. 21, 2020 by the State Intellectual Property Office of P R. China in counterpart Chinese Patent Application No. 201810782055.0.

(Continued)

*Primary Examiner* — Derek J Rosenau
(74) *Attorney, Agent, or Firm* — Sughrue Mion, PLLC

(57) ABSTRACT

An interposer includes: a circuit board stack in which circuit boards are stacked; and an outer board arranged on at least one of outer side surfaces of the circuit board stack. The circuit boards are arranged include first conductive lines having first ends exposed through a first side portion of the circuit boards and second ends exposed through a second side portion opposite the first side portion of the circuit boards. The outer board includes second conductive lines having first ends exposed through a different side from the first side portion of the circuit boards and second ends exposed through a side portion located on a same side as the second side portion of the circuit boards.

15 Claims, 30 Drawing Sheets

(52) U.S. Cl.
CPC ........ *G01S 15/892* (2013.01); *G01S 15/8925* (2013.01); *G01S 7/5208* (2013.01)

(58) Field of Classification Search
USPC ........................................ 310/322, 334, 335
See application file for complete search history.

(56) References Cited

U.S. PATENT DOCUMENTS

| | | | |
|---|---|---|---|
| 8,278,801 B2 | 10/2012 | Matsumoto | |
| 8,872,412 B2* | 10/2014 | Tezuka | G10K 11/004 |
| | | | 310/334 |
| 2009/0015101 A1* | 1/2009 | Petersen | H01L 25/0657 |
| | | | 310/327 |
| 2011/0248603 A1 | 10/2011 | Tezuka et al. | |
| 2015/0045671 A1 | 2/2015 | Ozawa | |
| 2017/0023748 A1 | 1/2017 | Lucero et al. | |

FOREIGN PATENT DOCUMENTS

| | | |
|---|---|---|
| EP | 3 028 772 A2 | 6/2016 |
| WO | 02/40184 A2 | 5/2002 |
| WO | 2016084344 A1 | 6/2016 |

OTHER PUBLICATIONS

Communication dated Dec. 3, 2018, issued by the European Patent Office in counterpart European Application No. 18184159.4.

* cited by examiner

INTERPOSER, ULTRASOUND PROBE USING THE SAME, AND METHOD OF MANUFACTURING INTERPOSER

CROSS-REFERENCE TO RELATED APPLICATION(S)

This application is based on and claims priority under 35 U.S.C. § 119 to Korean Patent Application No. 10-2017-0091050, filed on Jul. 18, 2017, in the Korean Intellectual Property Office, the disclosure of which is incorporated by reference herein in its entirety.

BACKGROUND

1. Field

The disclosure relates to an ultrasound probe and a method of manufacturing the same, and more particularly, to an interposer, an ultrasound probe including the interposer, and a method of manufacturing the interposer.

2. Description of Related Art

An ultrasound diagnostic apparatus transmits an ultrasound signal generated by a transducer of an ultrasound probe to an object and receives information of a signal reflected by the object to obtain an image of the object, for example, an image of soft tissue or blood flow.

An ultrasound probe may be a one-dimensional (1D) probe for imaging a line region and a two-dimensional (2D) probe for imaging a surface region. A 1D probe includes transducer elements that transmit or receive an ultrasound signal and are aligned in a line, and a 2D probe includes transducer elements arranged in a matrix structure. However, it might be difficult to provide reliable electrical and signal interconnections for the transducer elements of the 2D probe that are arranged distally to the periphery of the matrix structure.

SUMMARY

Provided are interposers, ultrasound probes including the interposer, and methods of manufacturing the interposers and the ultrasound probes.

Additional aspects will be set forth in part in the description which follows and, in part, will be apparent from the description, or may be learned by practice of the presented embodiments.

In accordance with an aspect of the disclosure, an interposer includes: a circuit board stack in which a plurality of circuit boards are stacked; and an outer board arranged on at least one of outer side surfaces of the circuit board stack, wherein the circuit boards are arranged at least in a line and include a plurality of first conductive lines having a plurality of first ends exposed through a first side portion of the circuit boards and a plurality of second ends exposed through a second side portion opposite the first side portion of the circuit boards, wherein the outer board includes a plurality of second conductive lines having a plurality of first ends exposed through a different side from the first side portion of the circuit boards and a plurality of second ends exposed through a side portion located on a same side as the second side portion of the circuit boards.

Each of the plurality of circuit boards and the outer board may include a guide portion to align the plurality of circuit boards and the outer board when stacking the plurality of circuit boards and the outer board.

The guide portion may include a guide hole or a guide groove.

A film that adjusts a distance between the plurality of circuit boards may be interposed between the plurality of circuit boards.

The first ends of the second conductive lines may be exposed through an outer side surface of the outer board.

The first ends of the second conductive lines may be exposed through a side portion located on a same side as the second side portion of the circuit boards.

In accordance with an aspect of the disclosure, an ultrasound probe includes: a 2D acoustic module including piezoelectric elements arranged two-dimensionally; an integrated circuit chip; and an interposer between the 2D acoustic module and the integrated circuit chip, wherein the interposer includes: a circuit board stack in which a plurality of circuit boards are stacked; and an outer board arranged on at least one of outer side surfaces of the circuit board stack, wherein the circuit boards are arranged at least in a line and include a plurality of first conductive lines having a plurality of first ends exposed through a first side portion of the circuit boards and a plurality of second ends exposed through a second side portion opposite the first side portion of the circuit boards, wherein the outer board includes a plurality of second conductive lines having a plurality of first ends exposed through a different side from the first side portion of the circuit boards and a plurality of second ends exposed through a side portion located on a same side as the second side portion of the circuit boards, wherein the first ends of the first conductive lines are electrically connected to the piezoelectric elements, and the second ends of the first conductive lines and the second ends of the second conductive lines are electrically connected to the integrated circuit chip.

The interposer and the integrated circuit chip may be bonded using a flip chip bonding method.

The integrated circuit chip may include a surface-mount type package, and electrode terminals may be provided on a surface of the integrated circuit chip facing the interposer.

In accordance with an aspect of the disclosure, a method of manufacturing an interposer, includes: stacking a plurality of circuit boards; and arranging an outer board on at least one of outer side surfaces of the stacked plurality of circuit boards, wherein the circuit boards are arranged at least in a line and include a plurality of first conductive lines having a plurality of first ends exposed through a first side portion of the circuit boards and a plurality of second ends exposed through a second side portion opposite the first side portion of the circuit boards, wherein the outer board includes a plurality of second conductive lines having a plurality of first ends that are exposed through a different side from the first side portion of the circuit boards and a plurality of second ends that are exposed through a side portion located on a same side as the second side portion of the circuit boards.

BRIEF DESCRIPTION OF THE DRAWINGS

The above and/or other aspects, features, and advantages will become more apparent by describing certain embodiments with reference to the accompanying drawings, in which.

DETAILED DESCRIPTION

Figure 1:
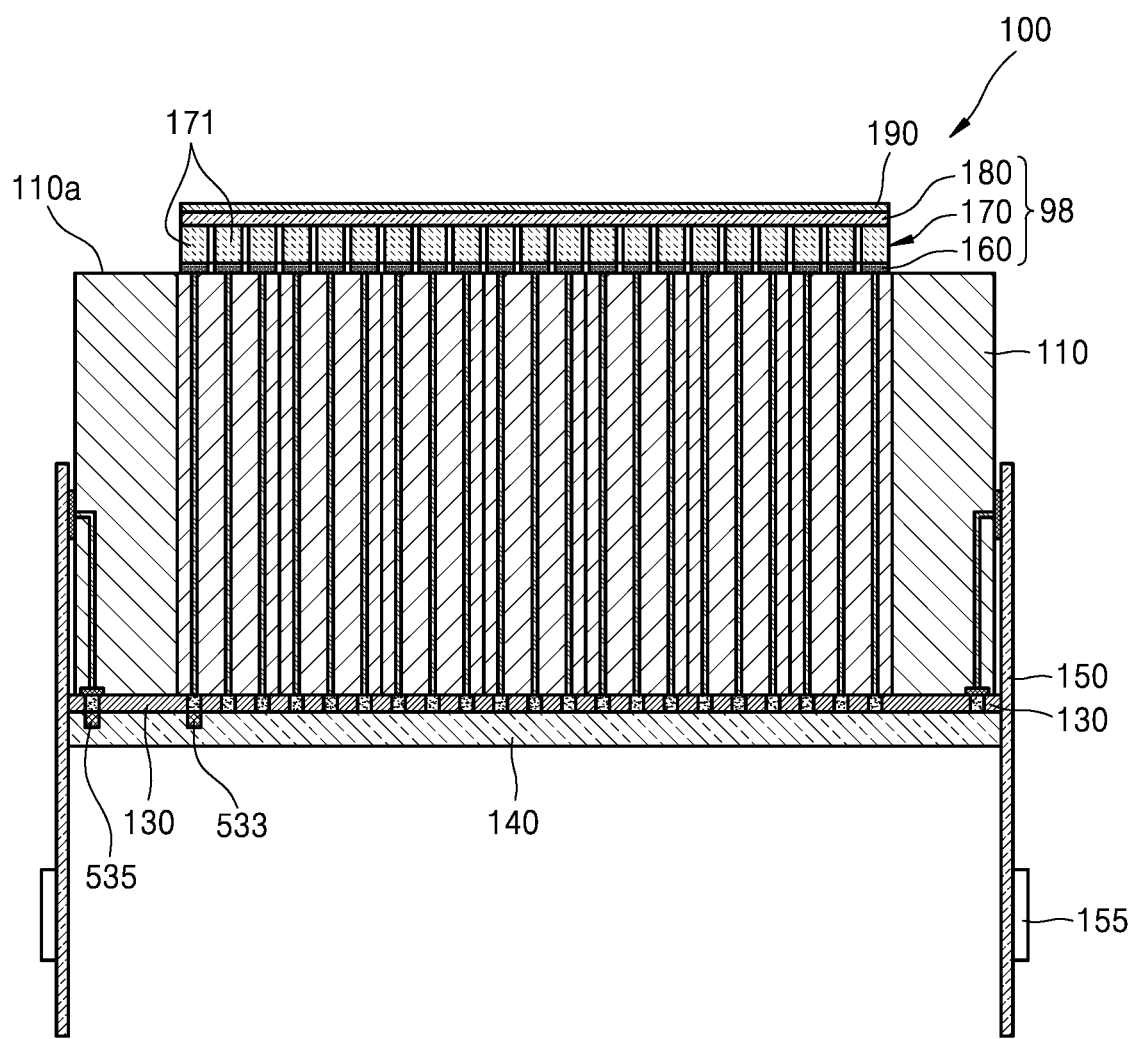
FIG. 1 is a schematic cross-sectional view of an ultrasound probe according to an embodiment.

Reference will now be made in detail to embodiments, examples of which are illustrated in the accompanying drawings, wherein like reference numerals refer to like elements throughout. In this regard, the embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Not all of the elements of the embodiments are described, and general knowledge of the technical field of the present disclosure or repeated details among embodiments are omitted. Terms such as "module" or "unit" used in the specification may be embodied by software, hardware, firm, or a combination thereof. In some embodiments, a plurality of 'modules' or 'units' may be implemented by one element, or a single 'module' or 'unit' may include a plurality of elements.

In the present specification, an "object", which is subject to imaging, may include a human, an animal, or a part of a human or an animal. For example, an object may include a part of a human body such as body organs or a phantom.

Throughout the specification, an "ultrasound image" refers to an image of an object that is processed based on ultrasound signals transmitted to and reflected by the object.

FIG. 1 is a schematic cross-sectional view of an ultrasound probe 100 according to an embodiment.

Referring to FIG. 1, the ultrasound probe 100 includes a piezoelectric layer 170 including a plurality of piezoelectric elements 171. The piezoelectric layer 170 is used as an ultrasound transducer to transmit acoustic energy to an object 610 (refer to FIG. 11), receive ultrasound reverberations returning from the object 610, and convert the ultrasound reverberations into an electrical signal for processing and displaying. The piezoelectric elements 171 of the piezoelectric layer 170 may be arranged two-dimensionally. The 2D arrangement may refer to, for example, an arrangement in which two or more columns and two or more rows are arranged, but is not limited thereto. The piezoelectric elements 171 may be arranged such that all of the piezoelectric elements 171 are on one surface or along a curve to provide a convex or concave arrangement. Each of the piezoelectric elements 171 of the piezoelectric layer 170 may be in a bar or block shape and may be formed of a piezoelectric material such as ceramic or polymer. The piezoelectric layer 170 may be cut into columns and rows or processed through a dicing process to form an arrangement of the piezoelectric elements 171. The piezoelectric elements 171 may be divided into several hundreds to millions of pieces and arranged in several tens to hundreds of rows and several tens to hundreds of columns. The piezoelectric elements 171 may be equidistant from each other, but are not limited thereto. Space between the piezoelectric elements 171 is known as kerfs. Kerfs may be filled with a predetermined filling material, that is, an attenuating material of low acoustic impedance or the air, to prevent transfer of vibration or absorb vibration between the adjacent piezoelectric elements 171.

A lower electrode layer 160 is provided under the piezoelectric layer 170. The lower electrode layer 160 may be formed of a material having a high conductivity and high acoustic impedance. For example, the lower electrode layer 160 may be formed of a material such as tungsten, tungsten carbide or the like. The lower electrode layer 160 includes a plurality of lower electrodes that are divided such that they are respectively not electrically connected to each other so as to correspond to the piezoelectric elements 171 of the piezoelectric layer 170.

An acoustic matching layer 180 is provided on the piezoelectric layer 170.

A common electrode layer may be provided between the piezoelectric layer 170 and the acoustic matching layer 180. The acoustic matching layer 180 formed of a conductive material may itself function as a common electrode layer.

An acoustic lens layer 190 may be provided on the acoustic matching layer 180. However, the acoustic lens layer 190 may be omitted.

The piezoelectric layer 170, the acoustic matching layer 180, and the acoustic lens layer 190 described above form a 2D acoustic module 98.

An electrical interconnection assembly is provided under the 2D acoustic module to provide electrical wiring of each of the piezoelectric elements 171 of the piezoelectric layer 170.

The electrical interconnection assembly includes an integrated circuit chip 140 that is electrically connected to the 2D acoustic module via the interposer 110 and a bonding mask 130. As described above, thousands of piezoelectric elements 171 of the piezoelectric layer 170 may be included, and a signal may be independently transmitted or received to or from each of them. As the number of wirings to be included in a cable electrically connected to an ultrasound probe and a main body of the ultrasound diagnostic apparatus is limited, it is difficult to include all wirings respectively corresponding to the piezoelectric elements 171 in a cable. The integrated circuit chip 140 may be an Application Specific Integrated Circuit (ASIC) that includes a circuit to reduce the number of wirings needed in an ultrasound probe apparatus for communication with the outside. The integrated circuit chip 140 may include a surface-mount type package in which electrode terminals are arranged on a flat surface, e.g., a ball grid array (BGA). First terminals 533 which individually respectively correspond to the piezoelectric elements 171 of the piezoelectric layer 170 and to which a Tx/Rx signal is transmitted, are provided on a flat surface of the integrated circuit chip 140. In addition, the integrated circuit chip 140 includes second terminals 535 through which an external electrical signal is transmitted or received to supply power to the integrated circuit chip 140 or control the integrated circuit chip 140. The second terminals may be formed in an outer portion of the first terminals on the same flat surface on which the first terminals are formed.

An interposer 110 is provided between the 2D acoustic module and the integrated circuit chip 140.

One or more electrode pads 1155 (refer to FIG. 2G) for electrical connection of the second terminals of the integrated circuit chip 140 may be further included on a lateral surface of the interposer 110.

A flexible printed circuit board 150 for connecting by wire to the outside may be attached to a lateral surface of the interposer 110, and one or more electrode pads 155 (refer to FIG. 3F) of the flexible printed circuit board 150 may contact, for example, conducting wires of a cable extending to the outside. The conducting wires of a cable may be directly connected to the electrode pad 1155 located on the lateral surface of the interposer 110, without the flexible printed circuit board 150.

FIGS. 2A through 2H illustrate a method of manufacturing an interposer according to an embodiment.

Figure 2A:
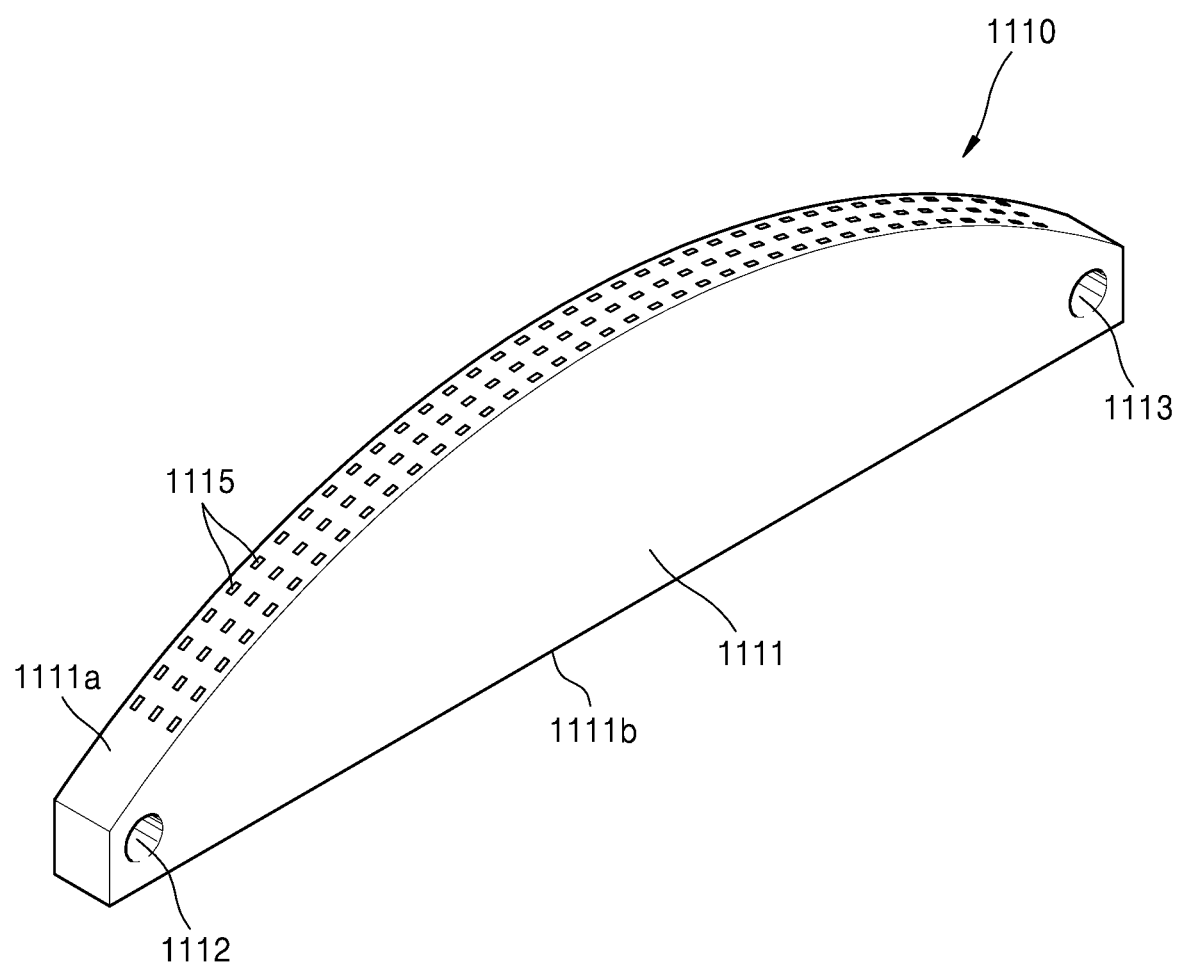
FIGS. 2A, 2B, 2C, 2D, 2E, 2F, 2G, and 2H illustrate a method of manufacturing an interposer according to an embodiment.

Referring to FIG. 2A, one or more circuit boards 1110 are prepared. The circuit boards 1110 include an insulator 1111 having a planar shape. As illustrated in a partial cross-sectional view of FIG. 2B, first conductive lines 1115 arranged in at least one line are provided in the insulator 1111. An arrangement of the first conductive lines 1115 corresponds to an arrangement of the piezoelectric elements 171 of the piezoelectric layer 170. That is, the number of the first conductive lines 1115 in one column in the arrangement of the first conductive lines 1115 is the same as the number of the piezoelectric elements 171 in one column of the arrangement of the piezoelectric elements 171. A pitch distance of the first conductive lines 1115 corresponds to a pitch distance of the piezoelectric elements 171 of the piezoelectric layer 170. A first side portion 1111a of the insulator 1111 may have a curved shape, and a second side portion 1111b opposite the first side portion 1111a may have a flat shape. Two ends of each of the first conductive lines 1115 are respectively exposed through the first side portion 1111a and the second side portion 1111b of the insulator 1111. First ends 1122 of the first conductive lines 1115 exposed through the first side portion 1111a are respectively electrically connected to lower electrodes of the lower electrode layer 160 on a one-on-one basis. Second ends 1124 of the first conductive lines 1115 exposed through the second side portion 1111b are respectively electrically connected to first terminals of the integrated circuit chip 140 on a one-on-one basis, with the bonding mask 130 included therebetween.

Because the piezoelectric layer 170 is located at the first side portion 1111a of the insulator 1111, a curved shape of the first side portion 1111a defines an arrangement of the piezoelectric layer 170 in a curved shape, and defines a surface of the ultrasound probe 100 that comes into contact with the object 610 (refer to FIG. 12) as a curved surface.

Guide holes 1112 and 1113 that function as a first guide portion when a plurality of the circuit boards 1110 being stacked may be formed in the circuit boards 1110. The number or locations of the guide holes 1112 and 1113 may be set such that they do not interfere with the first conductive lines 1115, and an embodiment is not limited by the number or location of the guide holes 1112 and 1113. The guide holes 1112 and 1113 are an example of a unit that guides when the circuit board 1110 are stacked, and may be in other various shapes. For example, instead of holes, a groove may be formed in one side portion of the circuit board 1110 to act as a guide when the circuit boards 1110 are stacked.

Figure 2B:
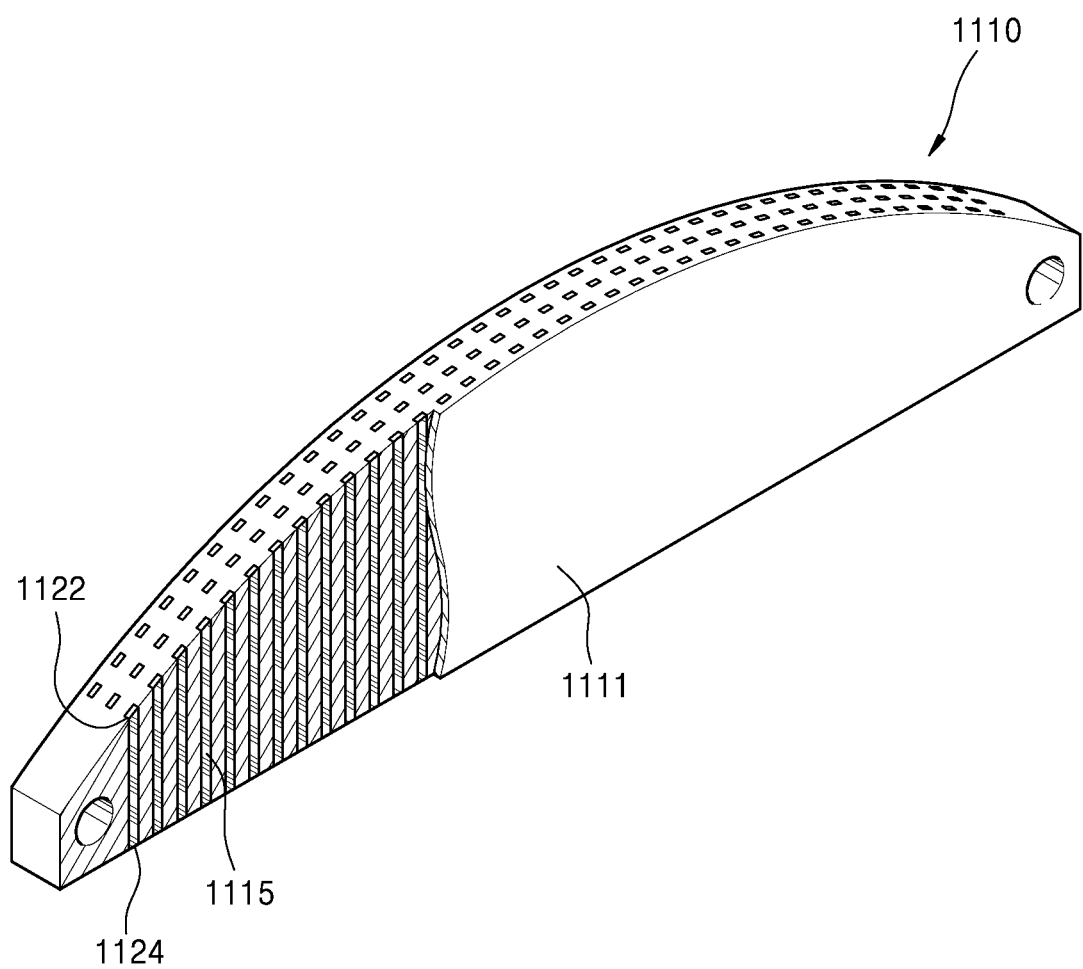

FIGS. 2A and 2B illustrate that first conductive lines 1115 arranged in three columns in one circuit board 1110, but the disclosure is not limited thereto.

Figure 2C:
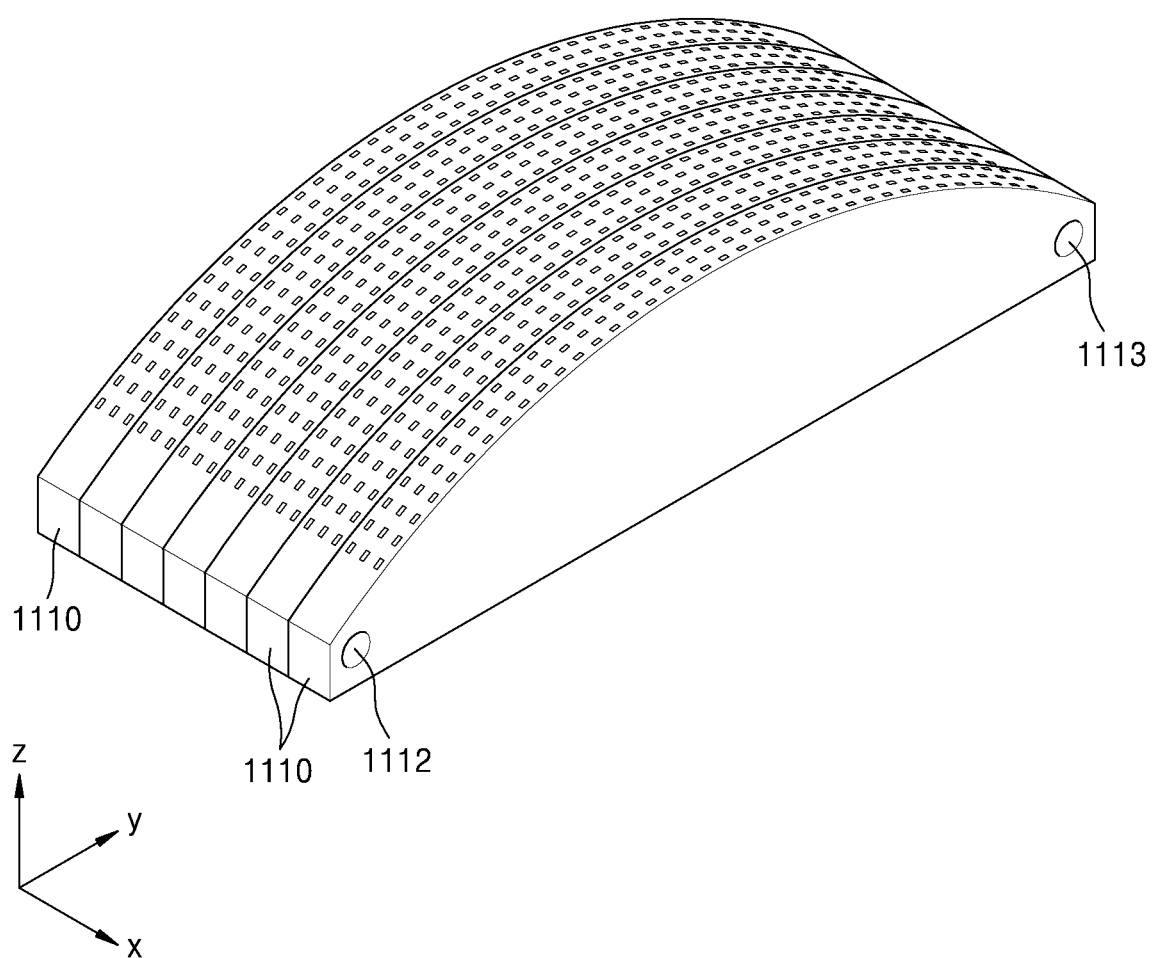

Referring to FIG. 2C, the circuit boards 1110 are stacked such that the first side portion 1111a and the second side portion 1111b are located on a same plane. During stacking of the circuit boards 1110, the circuit boards 1110 may be aligned by using the guide holes 1112 and 1113.

Figure 2D:
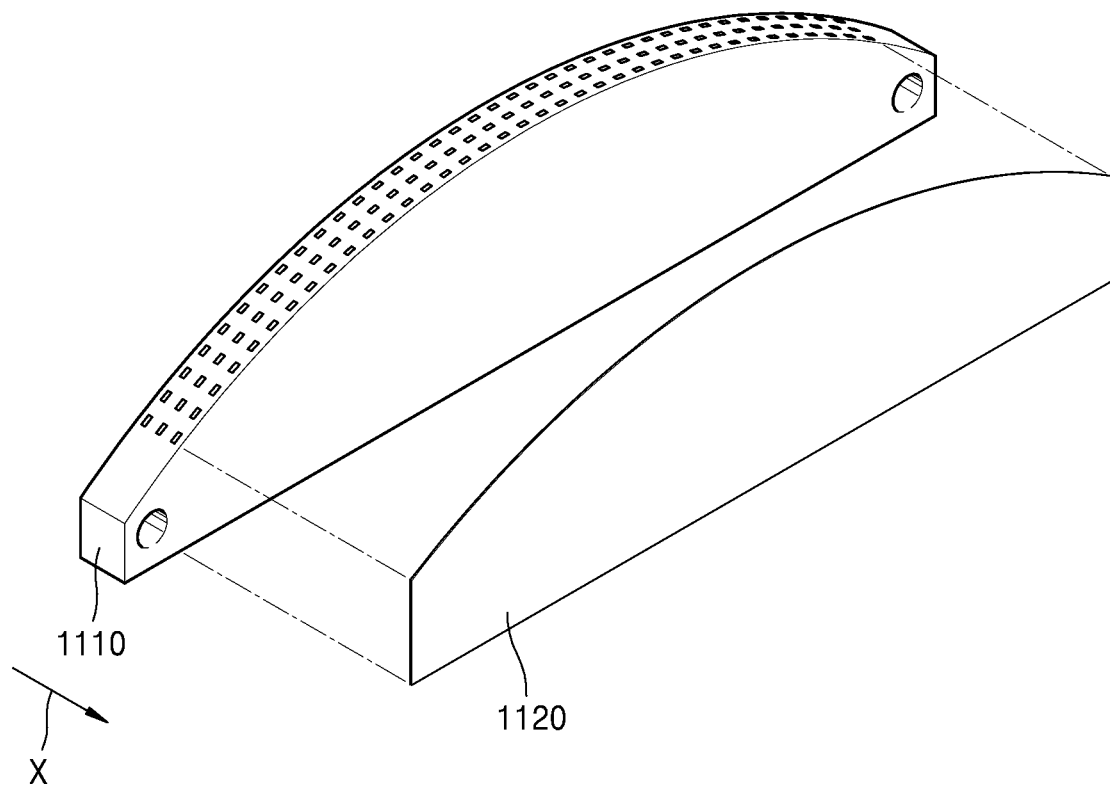
Figure 2E:
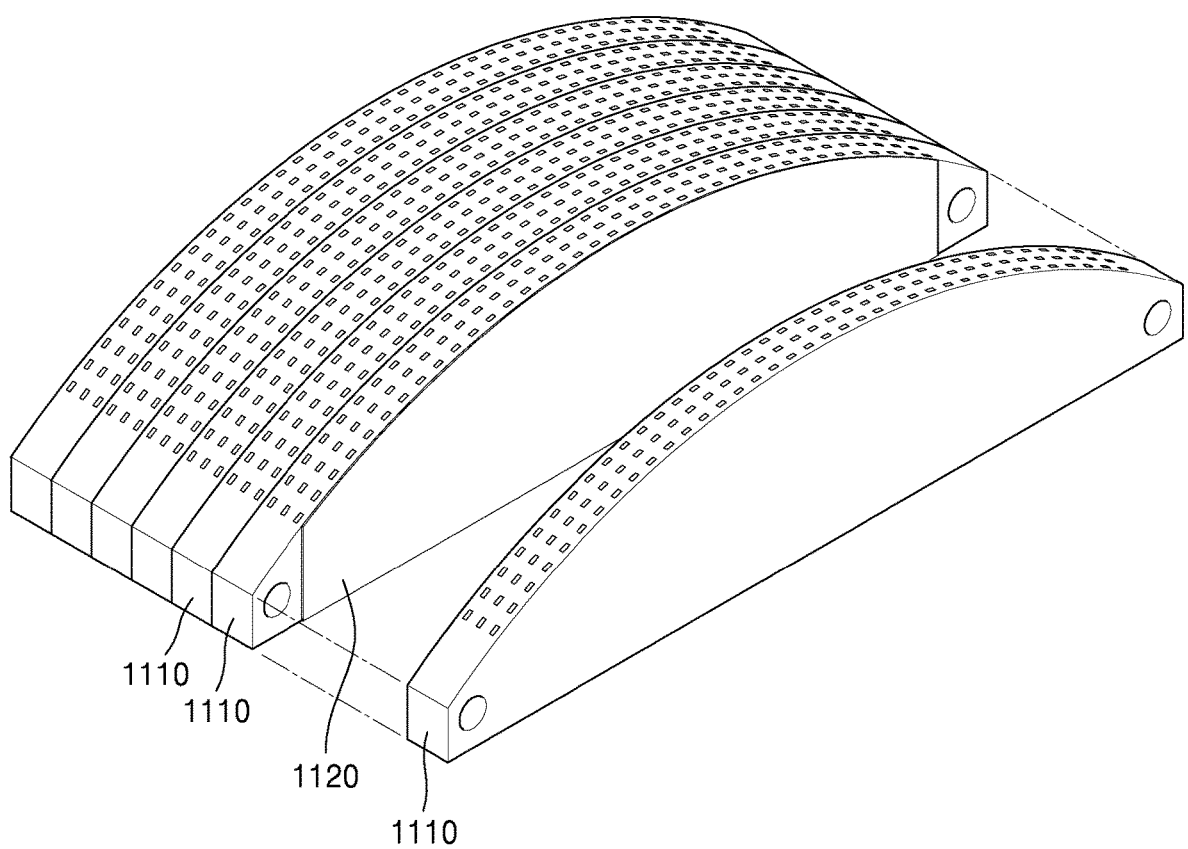

Referring to FIGS. 2D and 2E, during stacking of the circuit boards 1110, a pitch distance between the first conductive lines 1115 in a stacking direction x is of a sufficient size to interpose a film 1120 between the circuit boards 1110. By inserting the film 1120 into the stacking structure of the circuit boards 1110, a required pitch distance for the circuit boards 1110 and the first conductive lines 1115, for example, in the adjacent circuit boards 1110 may be adjusted.

Figure 2F:
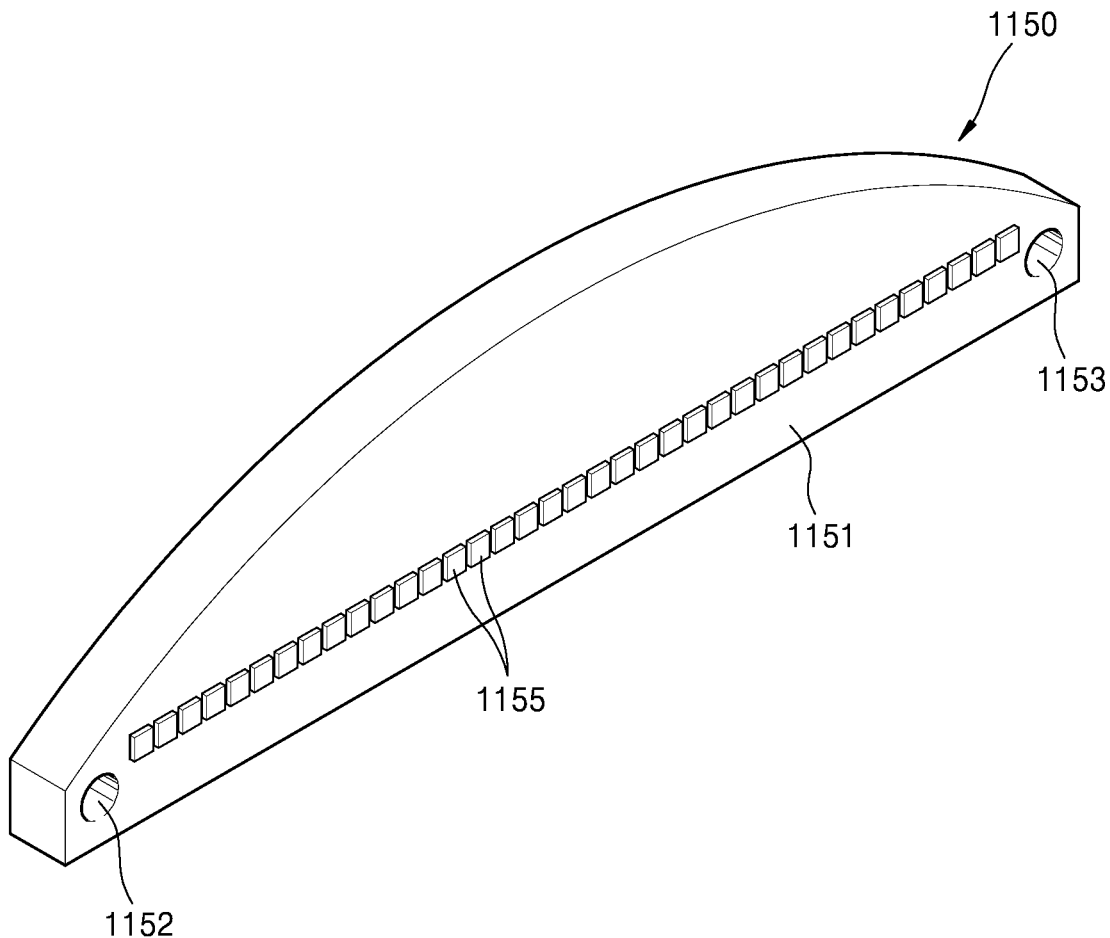
Figure 2G:
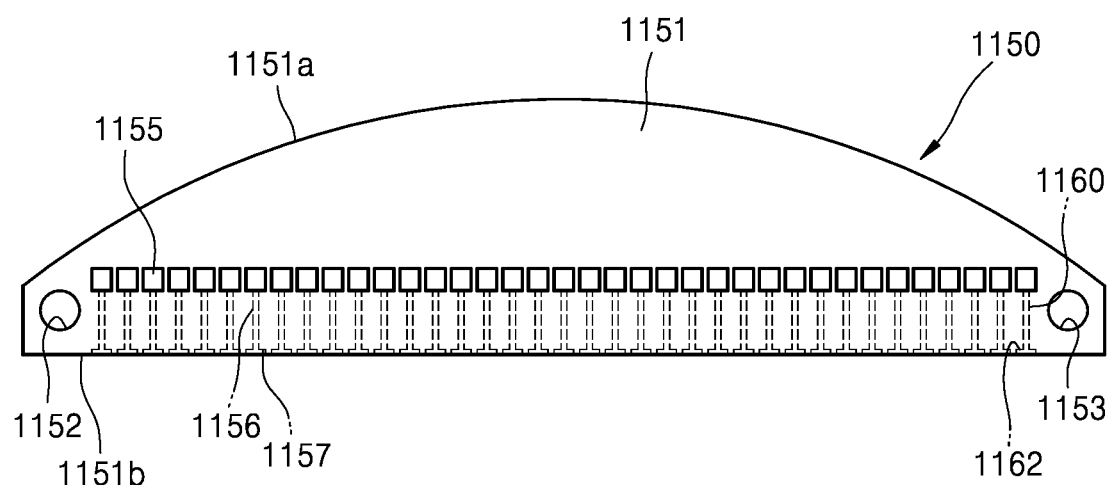

Referring to FIGS. 2F and 2G, one or more outer boards 1150 are prepared. FIG. 2F is a perspective view of the outer board 1150, and FIG. 2G is a side view of FIG. 2F. As illustrated in FIGS. 2F and 2G, the outer board 1150 has a same outer shape as the circuit boards 1110. That is, a first side portion 1151a of the outer board 1150 has a same curved shape as the first side portion 1111a of the circuit boards 1110, and a second side portion 1151b of the outer board 1150 has a same flat surface as the second side portion 1111b of the circuit boards 1110. The outer board 1150 may have guide holes 1152 and 1153, i.e., a second guide portion.

Second conductive lines 1156 are located in the outer board 1150, and first ends 1160 of the second conductive lines 1156 are exposed through an outer flat surface 1151 of the outer board 1150, and second ends 1162 of the second conductive lines 1156 are exposed through the second side portion 1151b. FIGS. 2F and 2G illustrate an arrangement where the second conductive lines 1156 are arranged in a line, but the arrangement is not limited thereto, and they may also be arranged in a plurality of columns. A plurality of electrode pads 1155 may be formed, respectively, at the first ends of the second conductive lines 1156 exposed through the outer flat surface of the outer board 1150 to facilitate electrical connection. FIG. 2F and FIG. 2G show a case in which the electrode pads 1155 are arranged in one column, but the present disclosure is not limited thereto. The electrode pads 1155 may be arranged in a plurality of columns. A plurality of pads 1157 or terminals may be formed, respectively, at the second ends of the second conductive lines 1156 exposed through the second side portion 1151b to facilitate electrical connection. The pads 1157 may be formed adjacent an inner surface of the second side portion 1151b or outside second side portion 1151b.

The second side portion 1151b of the outer board 1150 contacts the integrated circuit chip 140 via the bonding mask 130 included therebetween, and thus, the second ends of the second conductive lines 1156 are electrically connected to the second terminals of the integrated circuit chip 140.

Figure 2H:
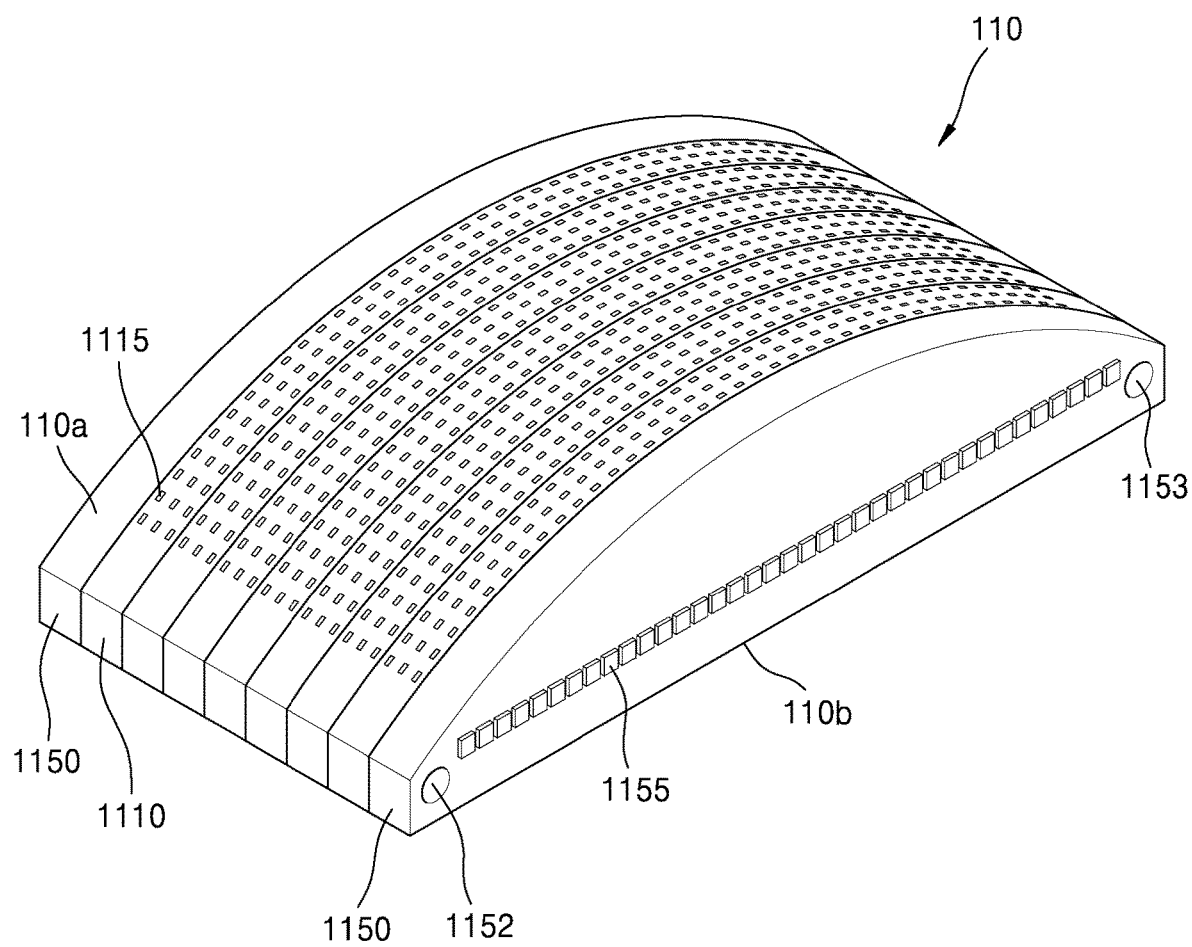

FIG. 2H illustrates that outer boards 1150 are respectively arranged on two outer portions of the circuit boards 1110 to complete the interposer 110. The outer boards 1150 may have a symmetrical structure, but the disclosure is not limited thereto. In some cases, one of the outer boards 1150 may be omitted.

According to the interposer 110 of an embodiment, first ends of the first conductive lines 1115 are exposed through an upper surface 110a of the interposer 110, and second ends of the first and second conductive lines 1115 and 1156 are exposed through a lower surface 110b thereof. The first ends of the first conductive lines 1115 are to be electrically connected to the piezoelectric elements 171, and the second ends of the first conductive lines 1115 are to be electrically connected to the first terminals of the integrated circuit chip 140. The second ends of the second conductive lines 1156 located in the outer portion are to be electrically connected to the second terminals of the integrated circuit chip 140. On the other hand, first ends of the second conductive lines 1156 are exposed through a lateral surface of the interposer 110 to form electrode pads 1155, thereby enabling electrical connection to the outside.

FIGS. 3A through 3G illustrate a method of manufacturing an electrical interconnection assembly, according to an embodiment.

Figure 3A:
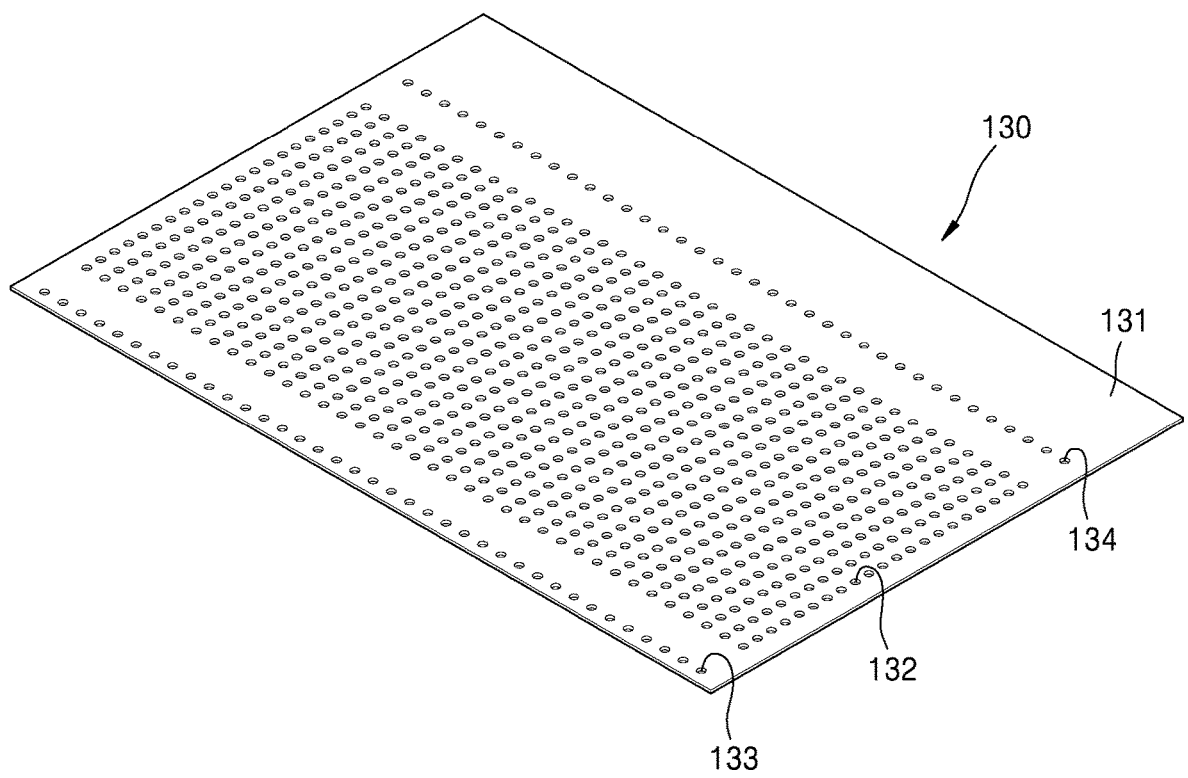
FIGS. 3A, 3B, 3C, 3D, 3E, 3F, and 3G illustrate a method of manufacturing an electrical interconnection assembly, according to an embodiment.

Referring to FIG. 3A, a bonding mask 130 is prepared. The bonding mask 130 includes an insulator flat plate 131 formed of an insulator and a plurality of first through holes 132, a plurality of second through holes 133, and a plurality of third through holes 134 formed in the insulator flat plate 131. The plurality of first through holes 132 are formed at positions corresponding to the second ends of the first conductive lines 1115 of the circuit boards 1110. The plurality of second through holes 133 and the plurality of third through holes 134 are formed at positions corresponding to the second ends of the second conductive lines 1156 of the circuit boards 1110.

Figure 3B:
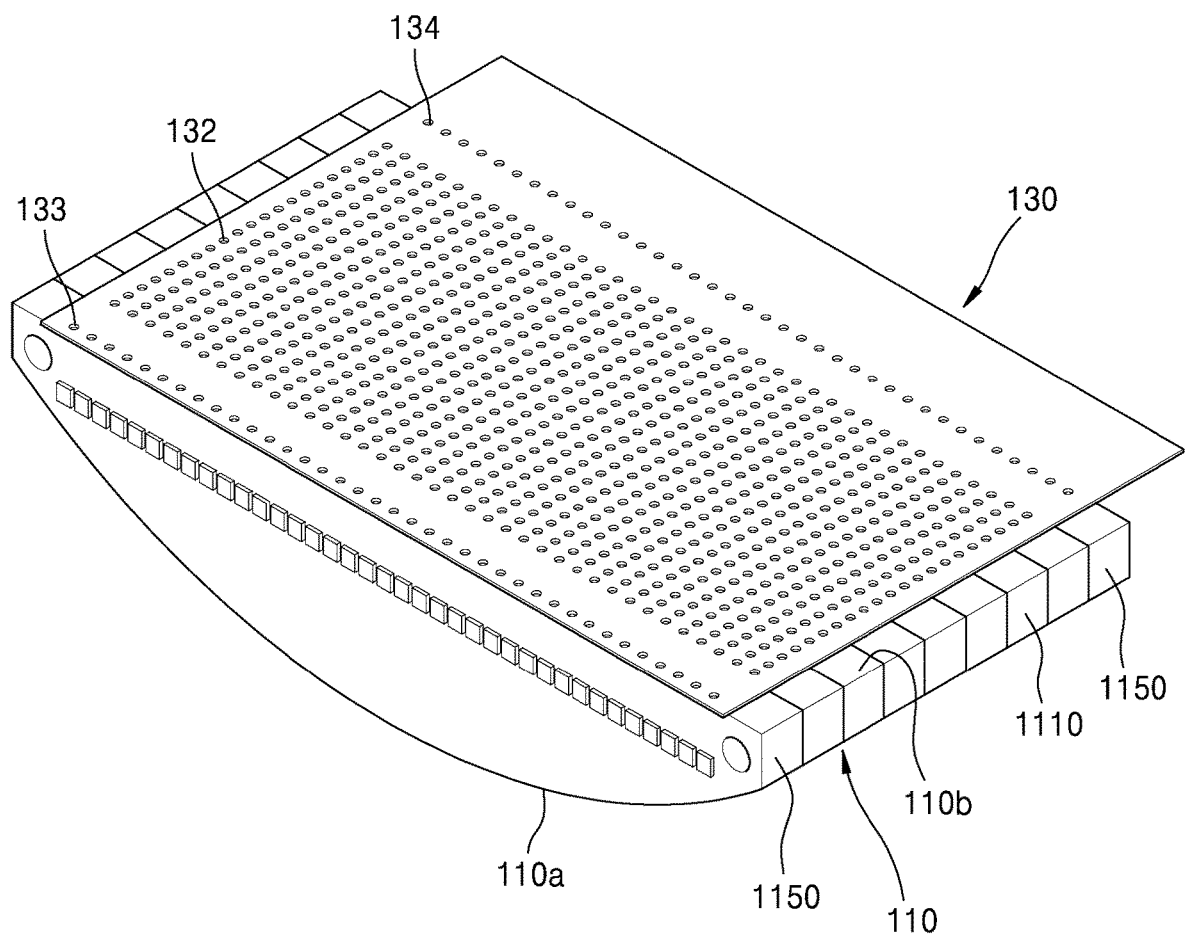
Figure 3C:
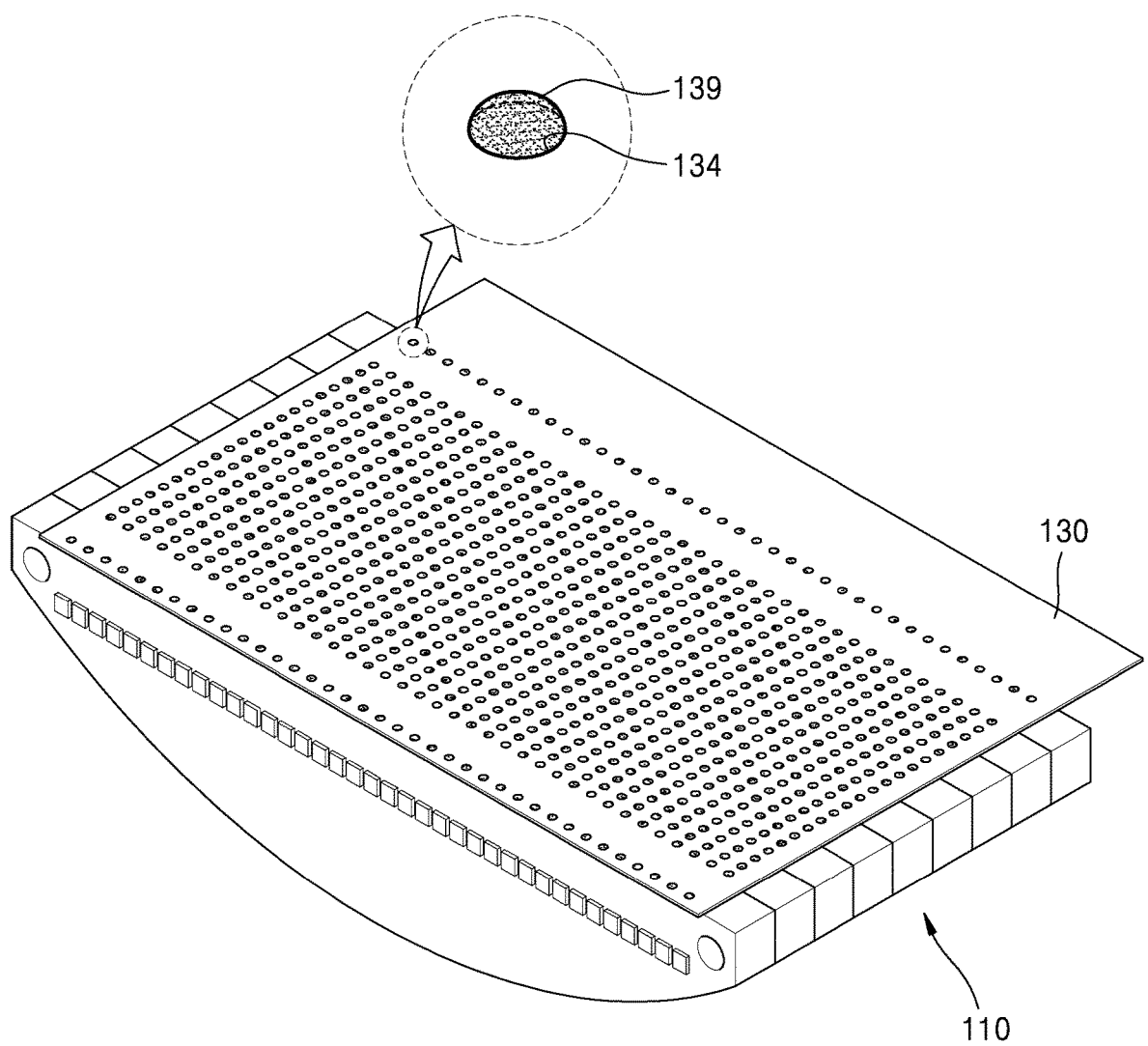

Next, as illustrated in FIGS. 3B and 3C, the bonding mask 130 is disposed on the lower surface 110b of the interposer 110, and a conductive epoxy 139 is filled in the plurality of first through third through holes 132, 133, and 134 of the bonding mask 130.

Figure 3D:
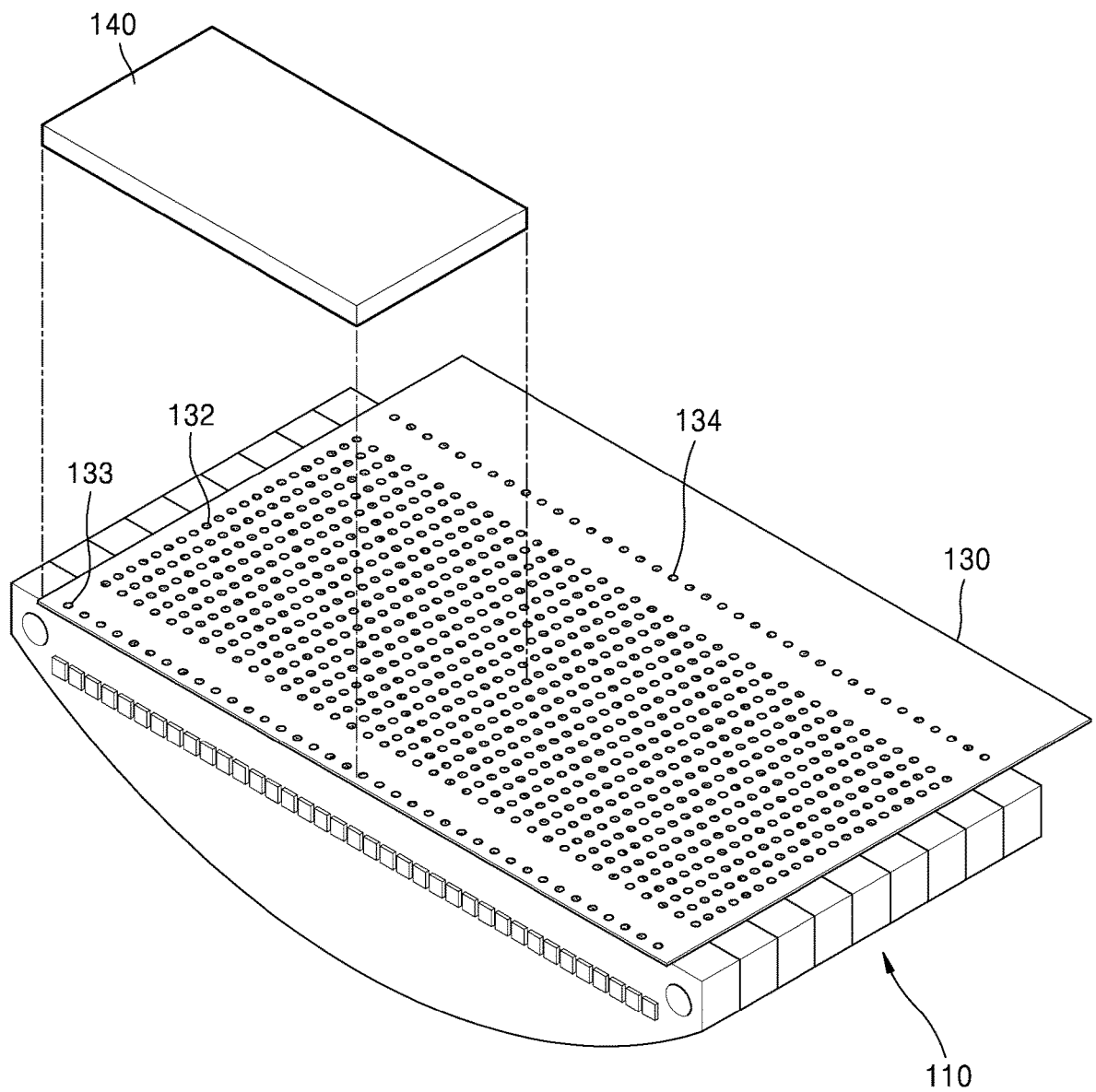
Figure 3E:
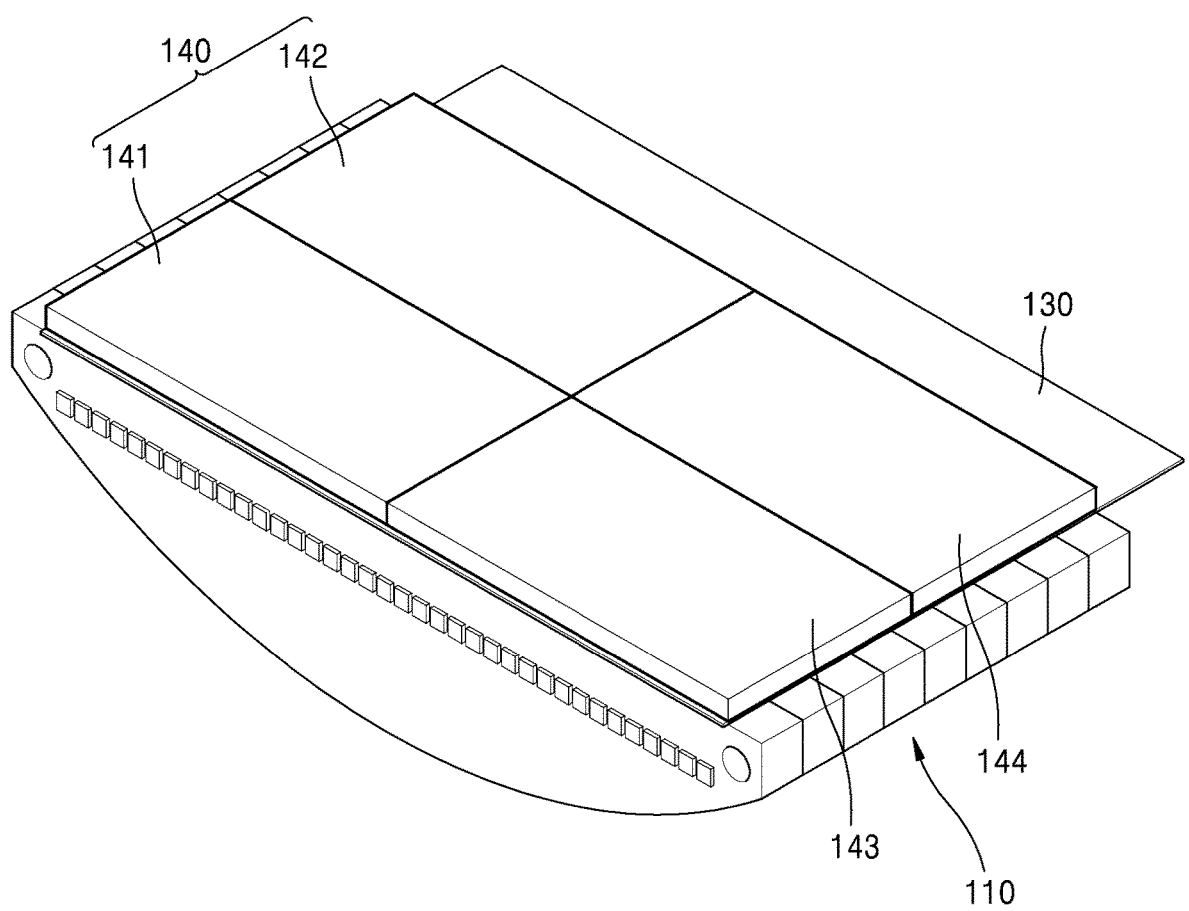

Next, as illustrated in FIGS. 3D and 3E, the integrated circuit chip 140 is attached to the bonding mask 130. As described above, the integrated circuit chip 140 has a surface-mount type package in which electrode terminals are arranged on a flat surface. The integrated circuit chip 140 is thus electrically connected to the first and second conductive lines 1115 and 1156 through the conductive epoxy 139 filled in the plurality of first through third through holes 132, 133, and 134 and is bonded to the bonding mask 130 at the same time. The bonding mask 130 and the integrated circuit chip 140 may be bonded, for example, by a flip chip bonding method. For example, by mounting bump balls that are smaller than the first through third through holes 132, 133, and 134 of the bonding mask 130 on the integrated circuit chip 140 and aligning the integrated circuit chip 140 with the bonding mask 130, the bump balls are inserted into the first through third through holes 132, 133 and 134 of the bonding mask 130. When the conductive epoxy 139 is hardened, the interposer 110 and the integrated circuit chip 140 are bonded to each other.

The number of the piezoelectric elements 171 may be thousands or more, and thus, the piezoelectric elements 171 may be divided into four groups and input and output functions may be respectively assigned to four integrated circuit chips 141, 142, 143, and 144. The number of the circuit chips does not limit an embodiment, and in some cases, a single integrated circuit chip 140 may be used to provide inputs and/or outputs of all of the piezoelectric elements 171.

Figure 3F:
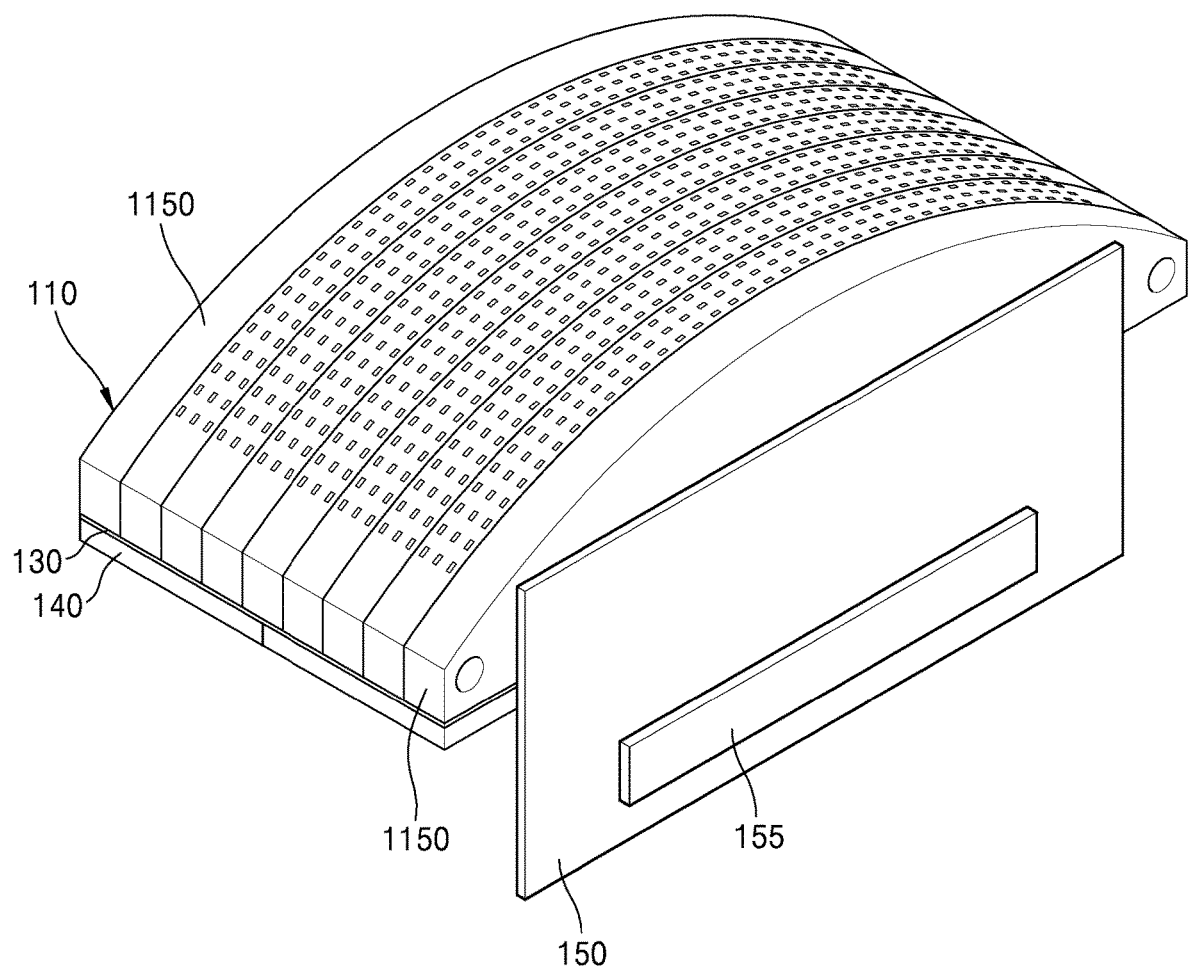

Next, as illustrated in FIG. 3F, the flexible printed circuit board 150 is attached to an outer portion of the interposer 110. The flexible printed circuit board 150 includes the electrode pad 155 and may be in contact with, for example, conducting wires of a cable extending to the outside.

Figure 3G:
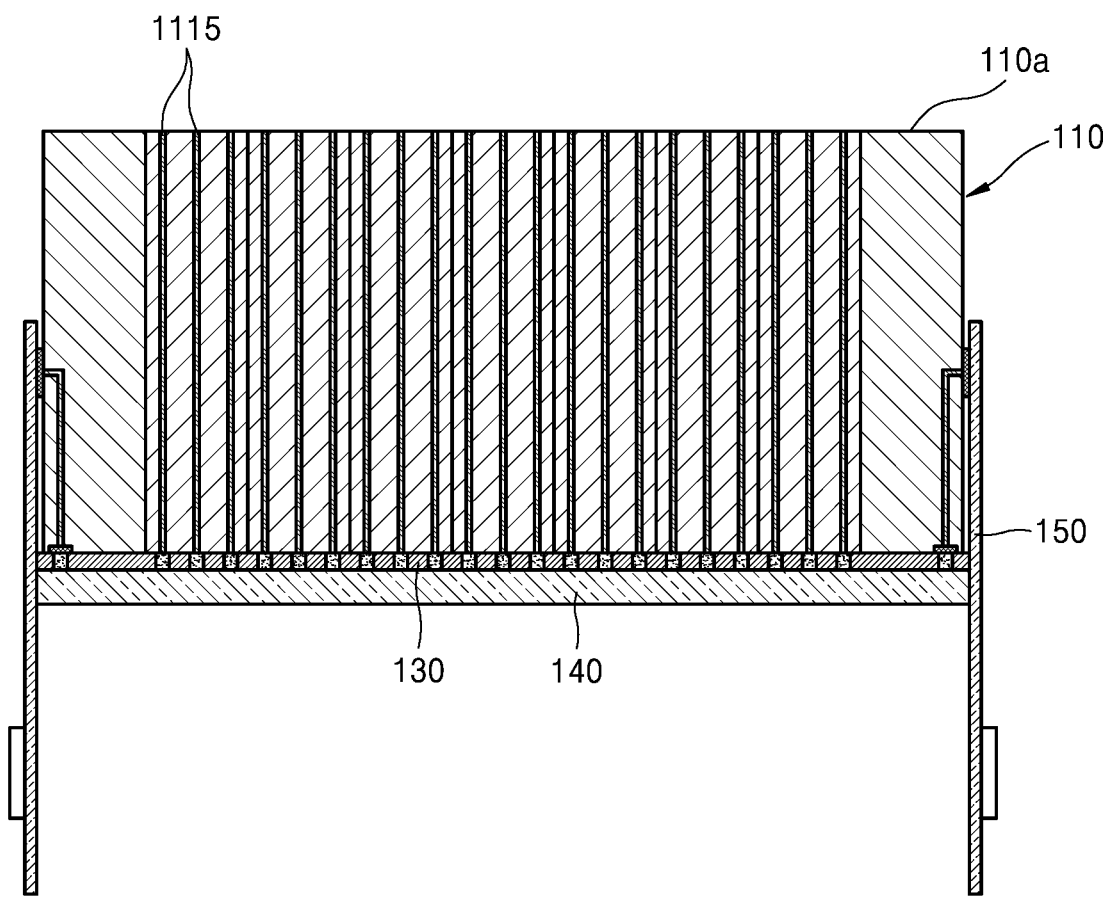

Referring to FIG. 3G, the flexible printed circuit board 150 is attached to both sides of the interposer 110 to complete the electrical interconnection assembly. This electrical interconnection assembly is attached to a lower portion of the 2D acoustic module to allow electrical input and output of the piezoelectric elements 171.

While the electrode pads 1155 are formed on both sides of the interposer 110 in the above-described embodiment, the outer board 1150 may also be provided only on one side and the electrode pads 1155 may be formed only on the one side.

Figure 4A:
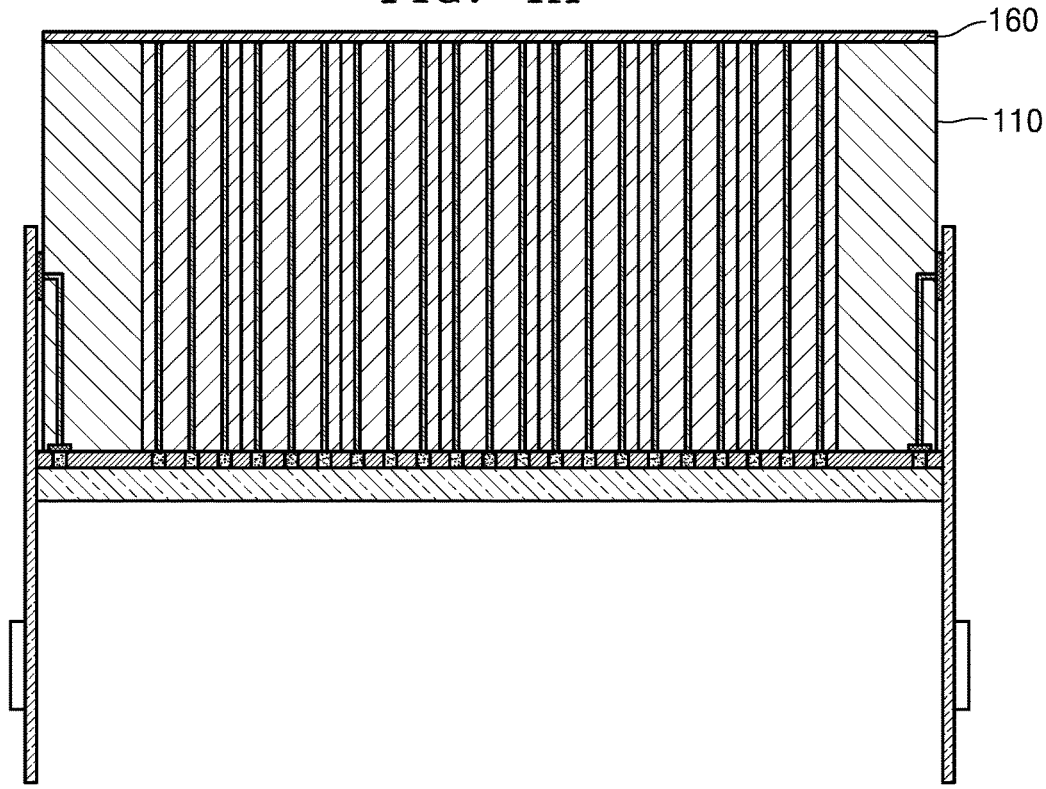
FIGS. 4A, 4B, and 4C illustrate a method of providing a 2D acoustic module in an electrical interconnection assembly, according to an embodiment.
Figure 4B:
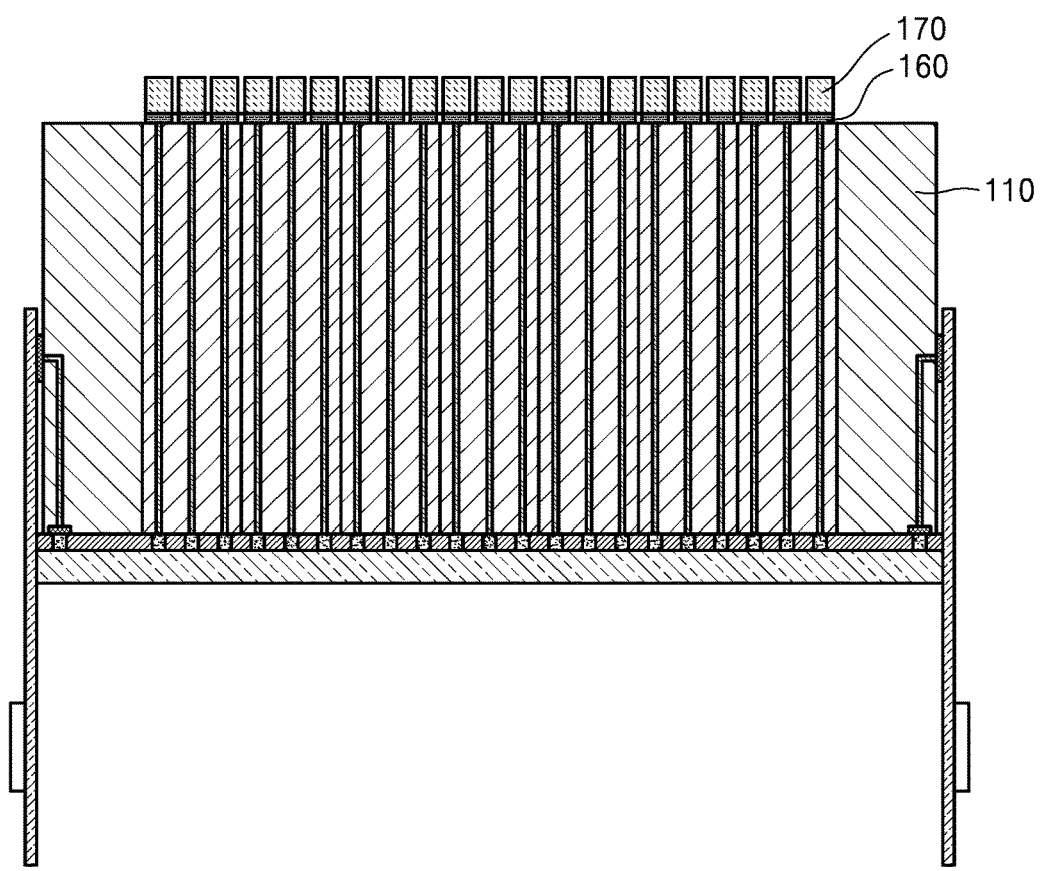
Figure 4C:
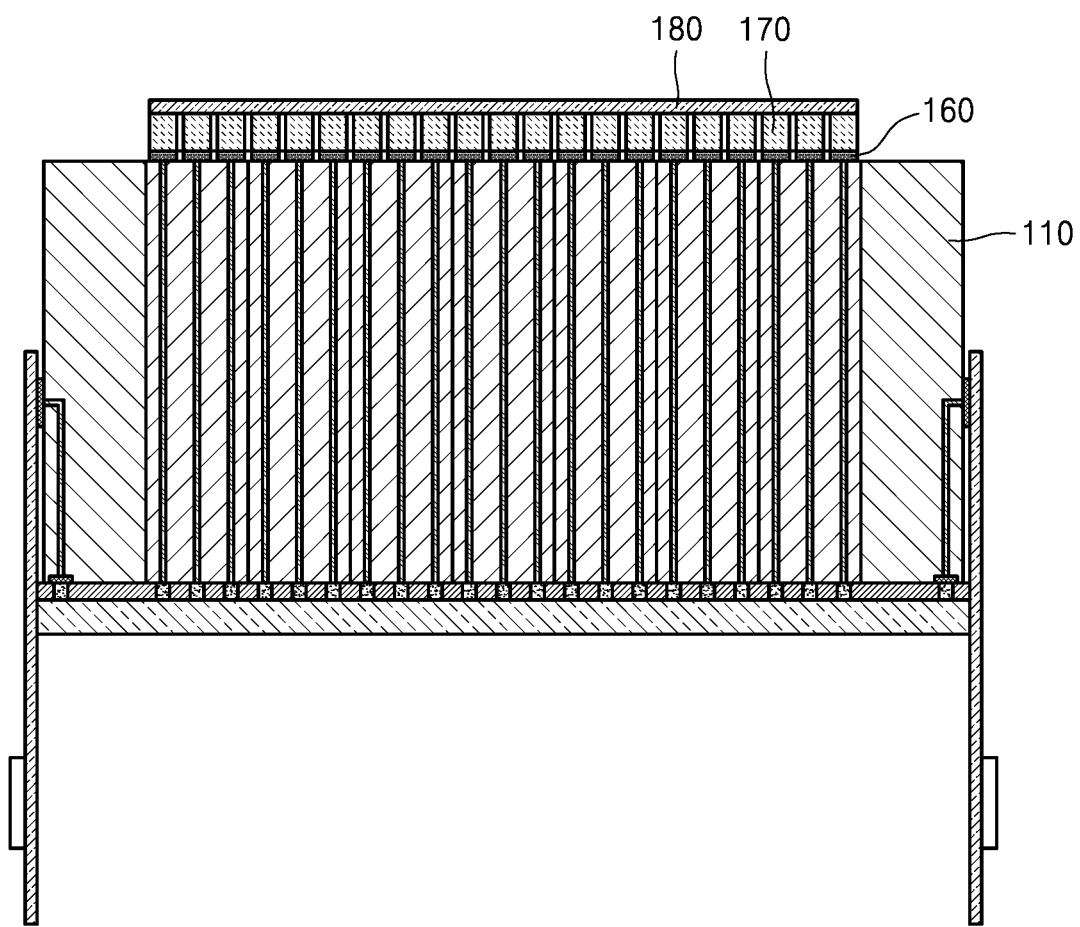

FIGS. 4A through 4C illustrate a method of providing a 2D acoustic module in an electrical interconnection assembly, according to an embodiment.

Referring to FIG. 4A, a lower electrode layer 160 formed of a conductive material is formed on an upper surface of the interposer 110 of the electrical interconnection assembly.

Next, as illustrated in FIG. 4B, a piezoelectric layer 170 is formed on the lower electrode layer 160. The lower electrode layer 160 and the piezoelectric layer 170 are diced to form the piezoelectric elements 171. In an embodiment, the lower electrode layer 160 may be first diced and divided, and then the piezoelectric elements 171 may be attached thereon.

Next, referring to FIG. 4C, an ultrasound probe may be manufactured by forming the acoustic matching layer 180 on the piezoelectric layer 170 and forming the acoustic lens layer 190 (refer to FIG. 1) on the acoustic matching layer 180.

Figure 5:
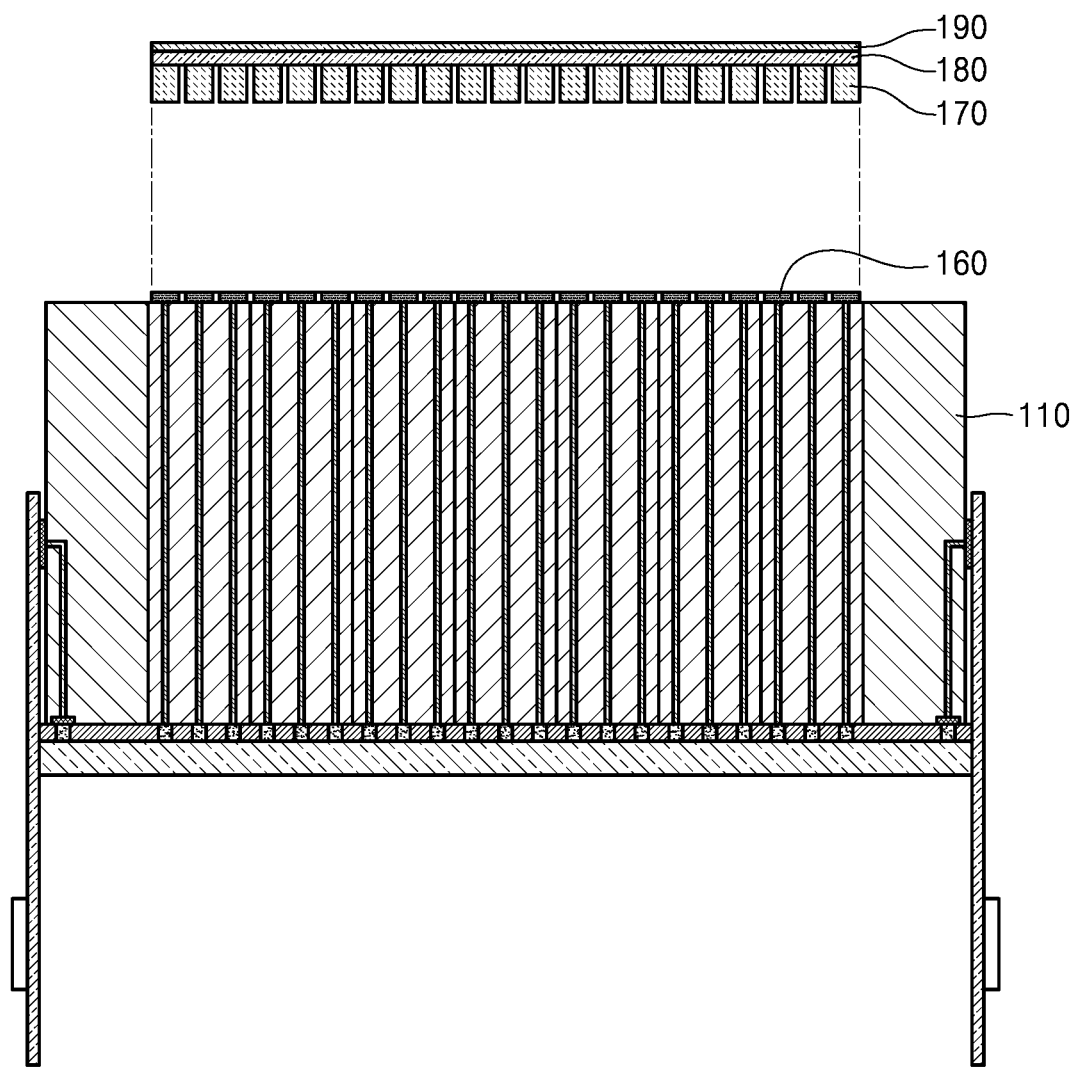
FIG. 5 illustrates a method of providing a 2D acoustic module in an electrical interconnection assembly, according to an embodiment.

FIG. 5 illustrates a method of providing a 2D acoustic module in an electrical interconnection assembly, according to an embodiment. Referring to FIG. 5, the 2D acoustic module including the piezoelectric layer 170 in which the piezoelectric elements 171 are divided into groups may be first manufactured and then attached to an electrical interconnection assembly.

Figure 6A:
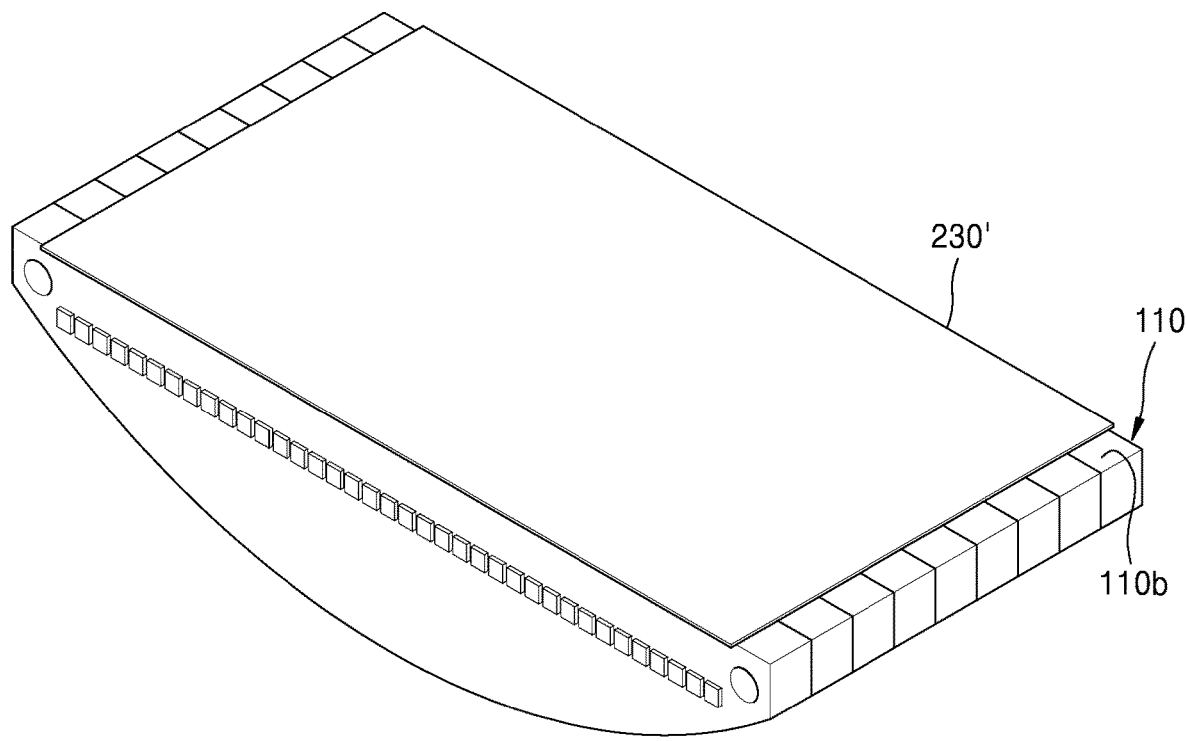
FIGS. 6A, 6B, and 6C illustrate a method of manufacturing a bonding mask, according to an embodiment.
Figure 6B:
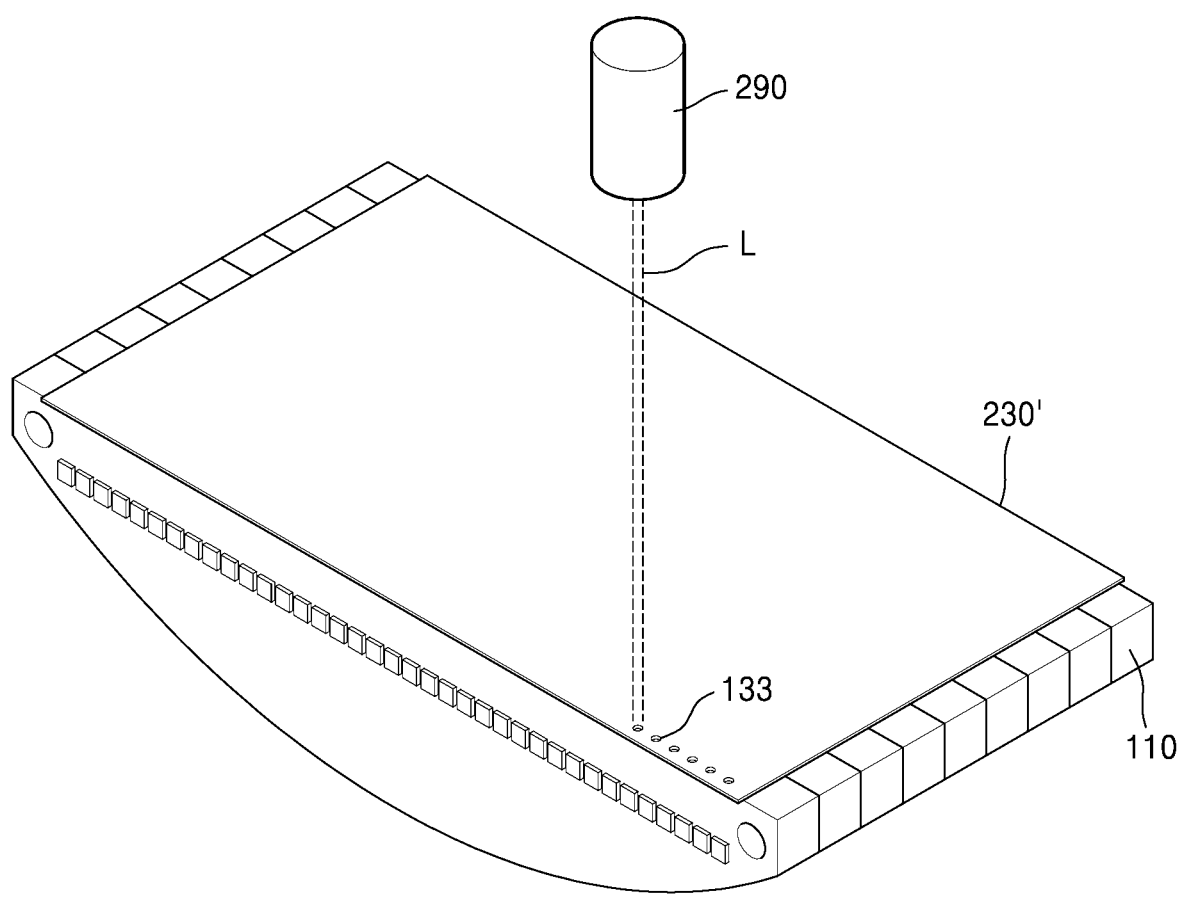
Figure 6C:
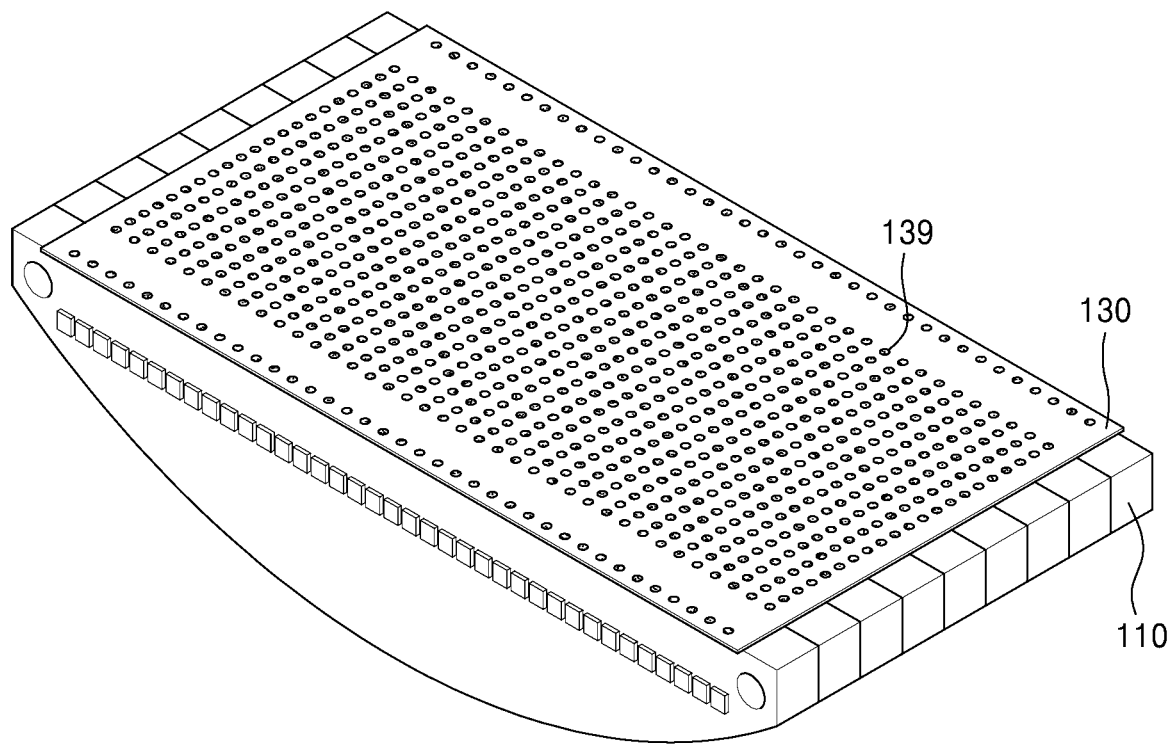

FIGS. 6A through 6C illustrate a method of manufacturing a bonding mask 130, according to an embodiment. Referring to FIG. 6A, a film 230' in which no through hole is formed is attached to the lower surface 110b of the interposer 110. When a transparent material is used as the film 230', positions of the second ends of the first and second conductive lines 1115 and 1156 exposed through the lower surface 110b of the interposer 110 may be determined.

Next, referring to FIG. 6B, first through third through holes 132, 133, and 134 are formed at positions corresponding to the second ends of the first and second conductive lines 1115 and 1156 of the film 230' by using a laser light source 290, and the bonding mask 130 is manufactured thereby.

Next, referring to FIG. 6C, a conductive epoxy 139 is filled in the first through third through holes 132, 133, and 134 of the bonding mask 130. Thereafter, as described with reference to FIGS. 3D and 3E, the integrated circuit chip 140 is attached to the bonding mask 130.

FIGS. 7A through 7E illustrate a method of manufacturing an interposer, according to an embodiment.

Figure 7A:
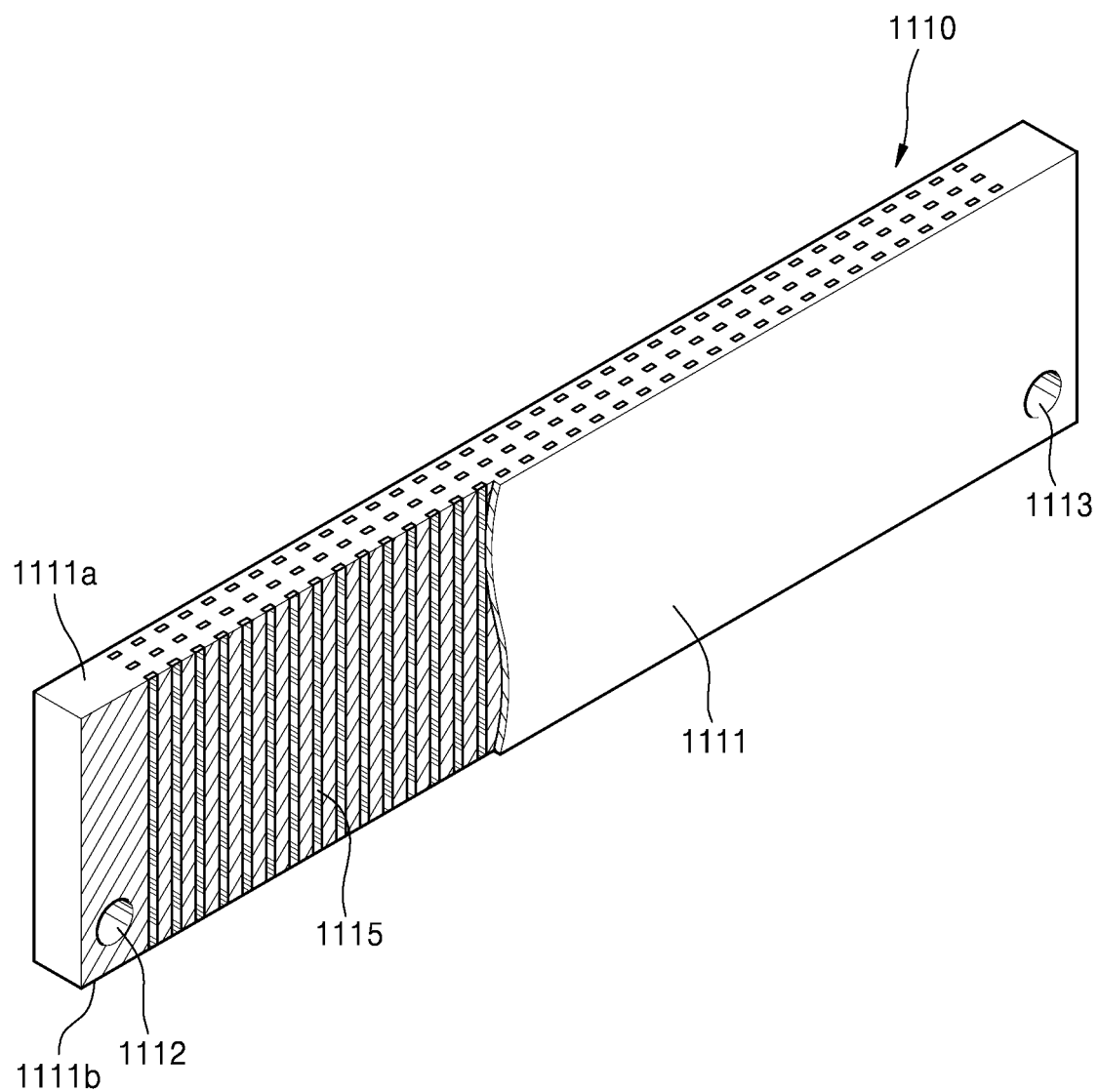
FIGS. 7A, 7B, 7C, 7D, and 7E illustrate a method of manufacturing an interposer, according to an embodiment.

Referring to FIG. 7A, one or more circuit boards 1110 are prepared. The circuit boards 1110 include an insulator 1111 having a planar shape and guide holes 1112 and 1113, and are substantially the same as described above with reference to FIGS. 2A and 2B. As illustrated in a partial cross-sectional view of FIG. 7A, first conductive lines 1115 arranged in at least one line are provided in the insulator 1111. A first side portion 1111a and a second side portion 1111b of the insulator 1111 may both have a planar shape.

Because the first side portion 1111a has a planar shape, the piezoelectric layer 170 also has a planar shape.

Figure 7B:
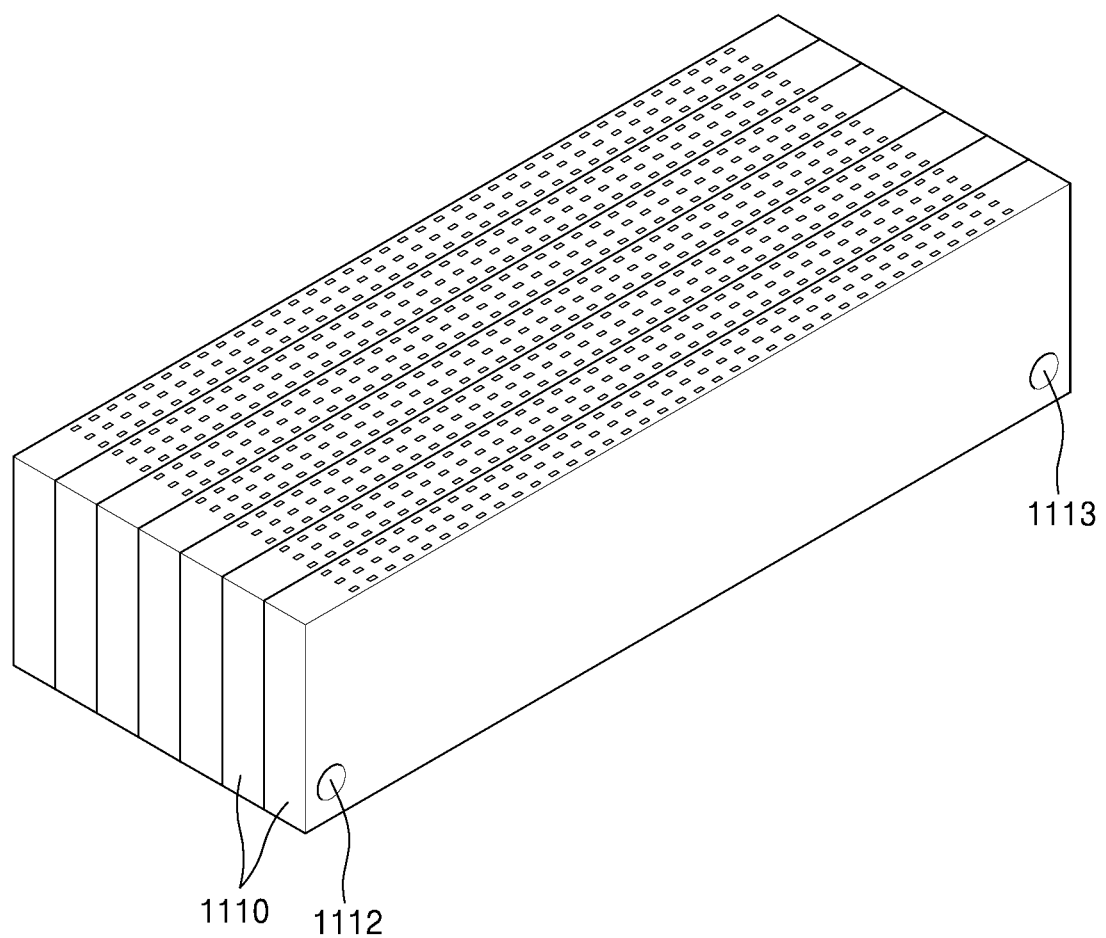

Referring to FIG. 7B, the circuit boards 1110 are stacked such that the first side portions 1111a and the second side portions 1111b, of the outer boards 1110, are respectively located on same surfaces. During stacking of the circuit boards 1110, the circuit boards 1110 may be aligned by using the guide holes 1112 and 1113. As described above, when the circuit boards 1110 are stacked, a distance between the circuit boards 1110 may be adjusted by interposing a film 1120 therebetween.

Figure 7C:
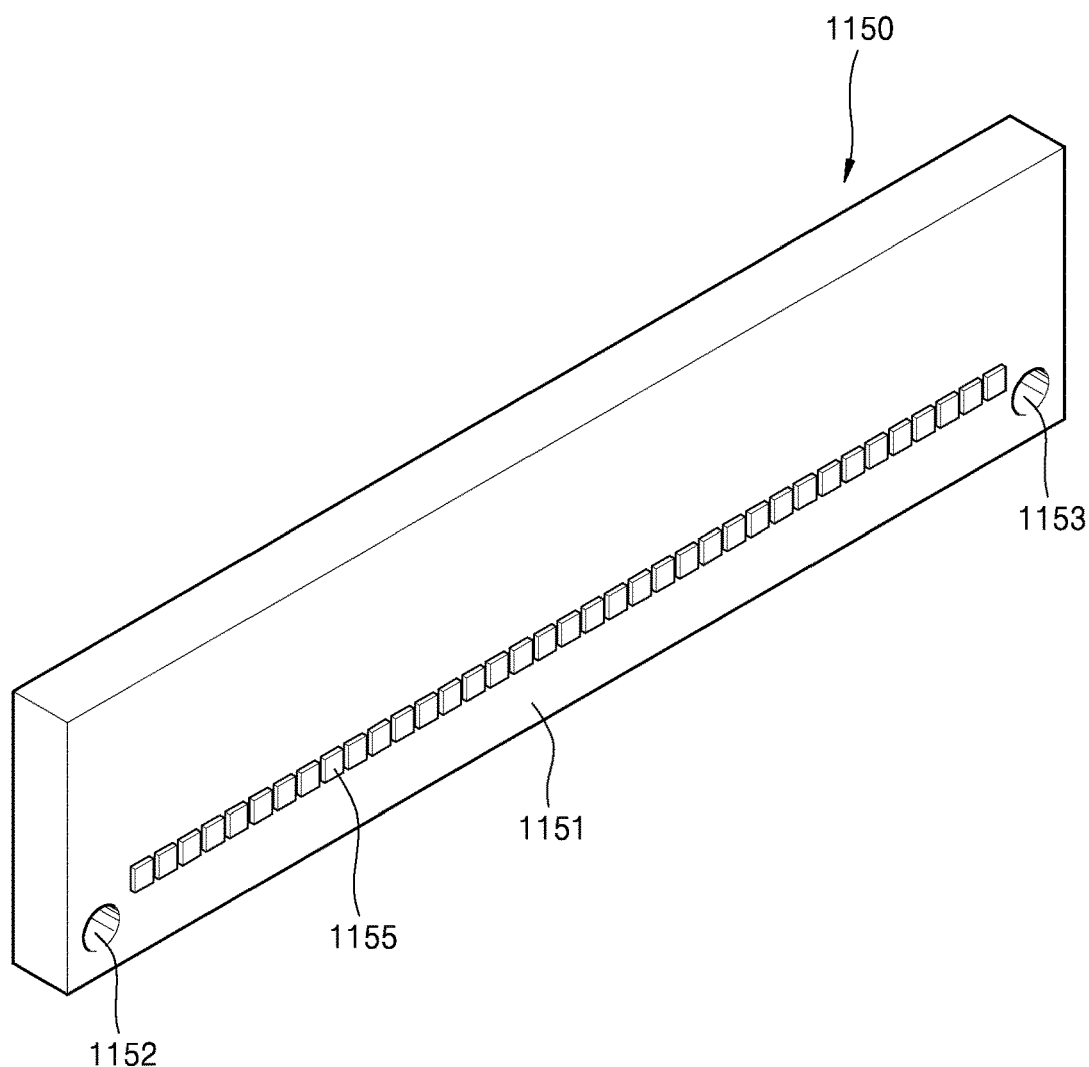
Figure 7D:
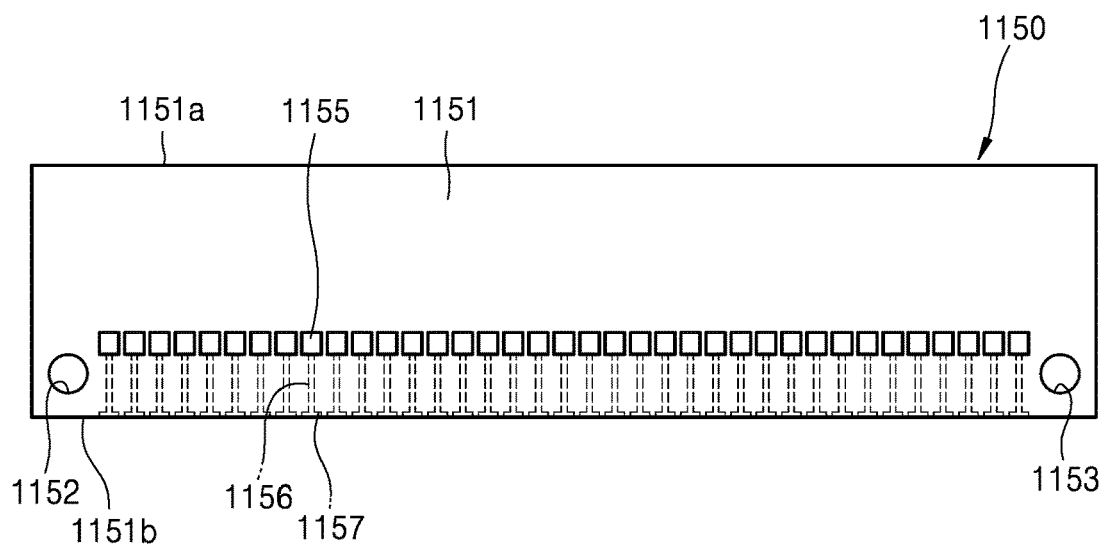

Referring to FIGS. 7C and 7D, an outer board 1150 is prepared. The outer board 1150 has a same outer shape as the circuit boards 1110. Second conductive lines 1156 are located in the outer board 1150, and first ends of the second conductive lines 1156 are exposed through an outer flat surface of the outer board 1150, and second ends of the second conductive lines 1156 are exposed through a second side portion 1151b. Electrode pads 1155 may be formed at the first ends of the second conductive lines 1156 exposed through the outer flat surface of the outer board 1150 to facilitate electrical connection. Terminals or pads 1157 may be formed at second ends of the second conductive lines 1156 exposed through the second side portion 1151b to facilitate electrical interconnection.

Figure 7E:
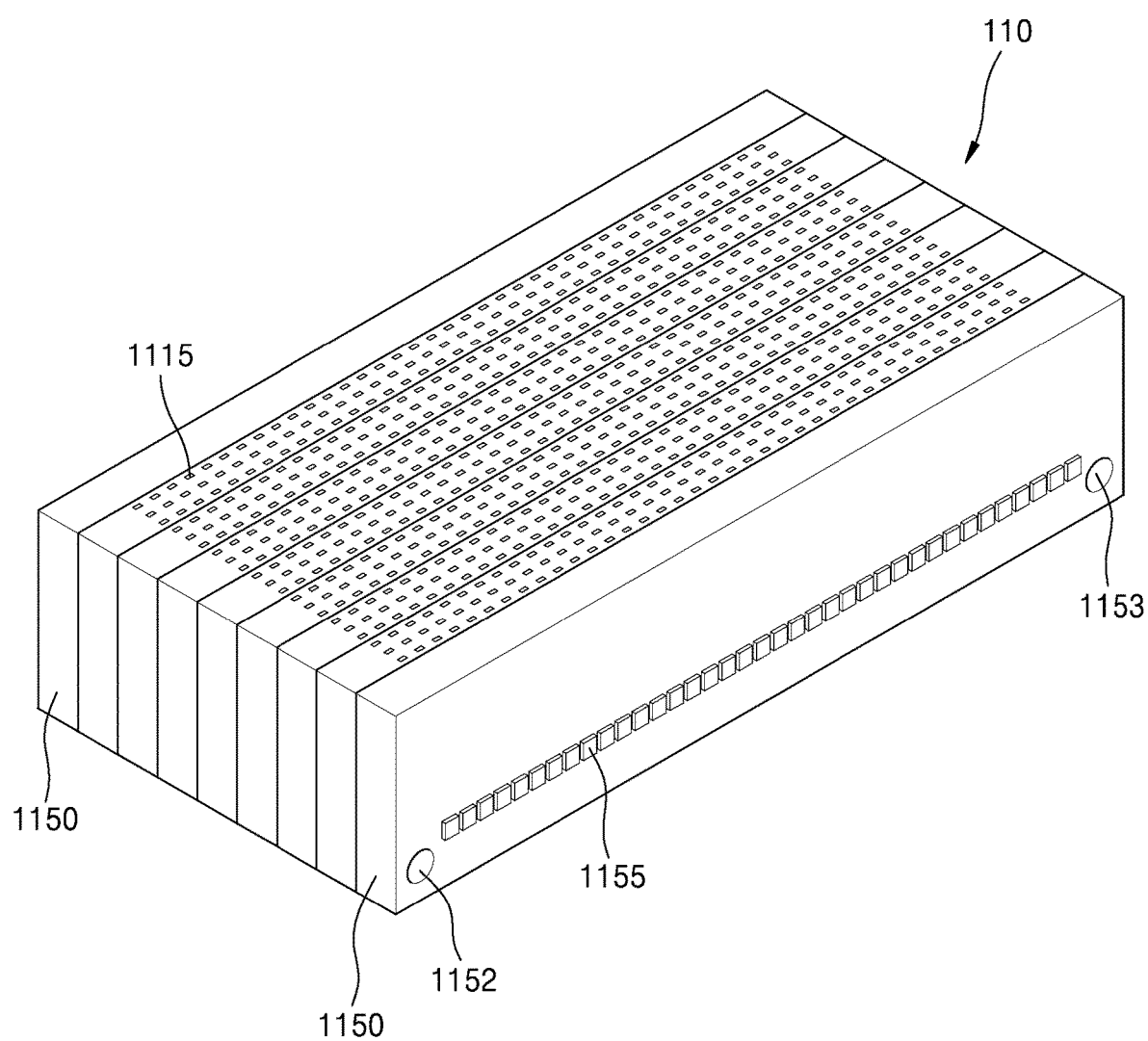

FIG. 7E illustrates that outer boards 1150 are respectively arranged on two outer portions of the circuit boards 1110 to complete an interposer 110. The outer boards 1150 may have a symmetrical structure, but are not limited thereto.

Figure 8A:
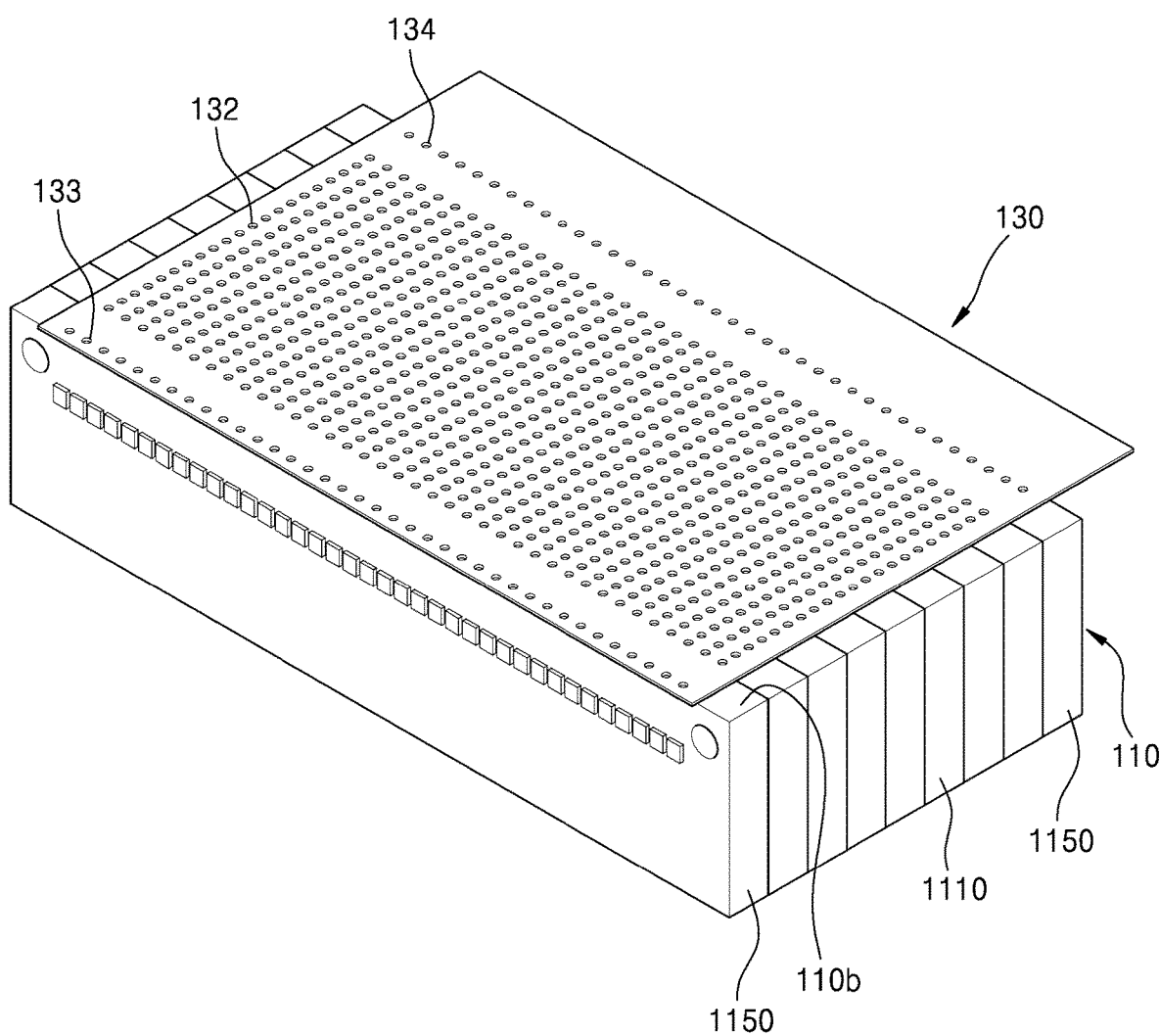
FIGS. 8A, 8B, and 8C illustrate a method of manufacturing an electrical interconnection assembly, according to an embodiment.
Figure 8B:
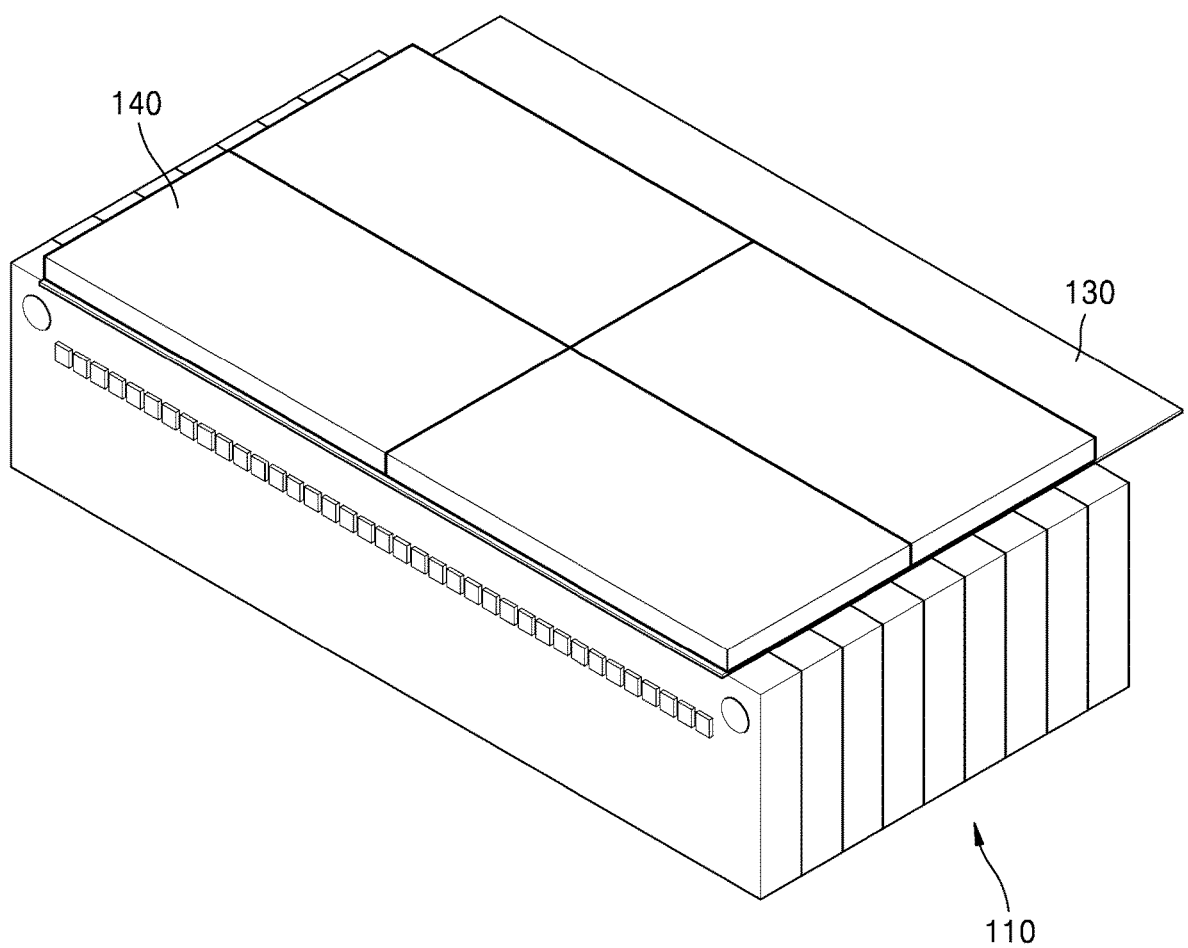
Figure 8C:
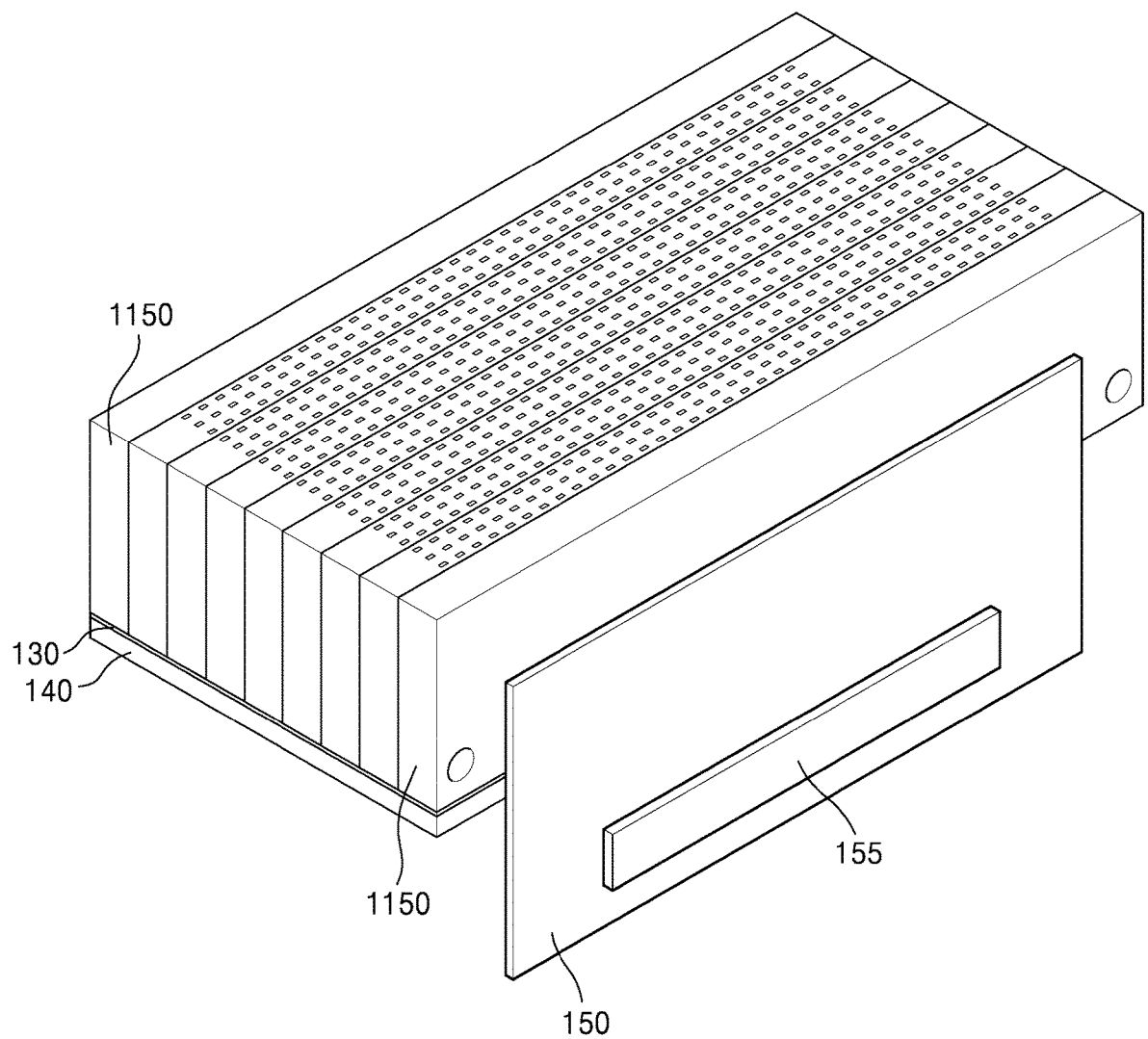

FIGS. 8A through 8C illustrate a method of manufacturing an electrical interconnection assembly, according to an embodiment.

Referring to FIG. 8A, a bonding mask 130 is disposed on a lower surface 110b of the interposer 110. The bonding mask 130 includes an insulator flat plate 131 formed of an insulator and a plurality of first through third through holes 132, 133, and 134. Next, the conductive epoxy 139 (refer to FIG. 3C) is filled in the plurality of first through third through holes 132, 133, and 134 of the bonding mask 130.

Next, as shown in FIG. 8B, the integrated circuit chip 140 is attached to the bonding mask 130. As described above, the integrated circuit chip 140 has a surface-mount type package in which electrode terminals are arranged on a flat surface. The integrated circuit chip 140 is thus electrically connected to first and second conductive lines of the interposer 110 through the conductive epoxy 139 filled in the plurality of first through third through holes 132, 133, and 134, and is bonded to the bonding mask 130 at the same time.

Next, as illustrated in FIG. 8C, a flexible printed circuit board 150 is attached to an outer portion of the interposer 110. The flexible printed circuit board 150 includes electrode pads 155 and may be in contact with, for example, conducting wires of a cable extending to the outside.

Referring back to FIG. 3G, the flexible printed circuit board 150 is attached to both sides of the interposer 110 to complete the electrical interconnection assembly. This electrical interconnection assembly is attached to a lower portion of a 2D acoustic module to allow electrical input and output of the piezoelectric elements 171.

Figure 9:
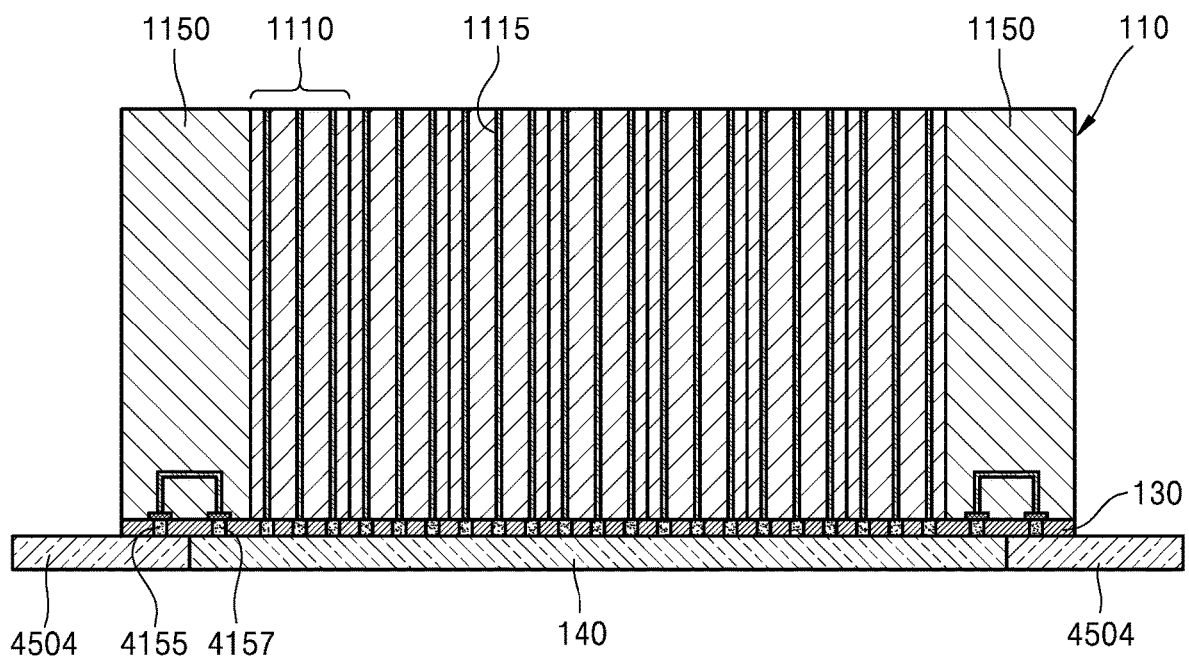
FIG. 9 is a schematic cross-sectional view of an electrical interconnection assembly according to an embodiment.

FIG. 9 is a schematic cross-sectional view of an electrical interconnection assembly according to an embodiment. Referring to FIG. 9, for external wiring, electrode pads 4155 of outer boards 1150 of an interposer 110 may be provided on a lower side portion of the interposer 110, together with pads 4157 for wiring with respect to the interposer 110. In this case, electrical wiring is provided as a flexible printed circuit board 4504 which contacts lower side portions of the outer boards 1150.

Figure 10:
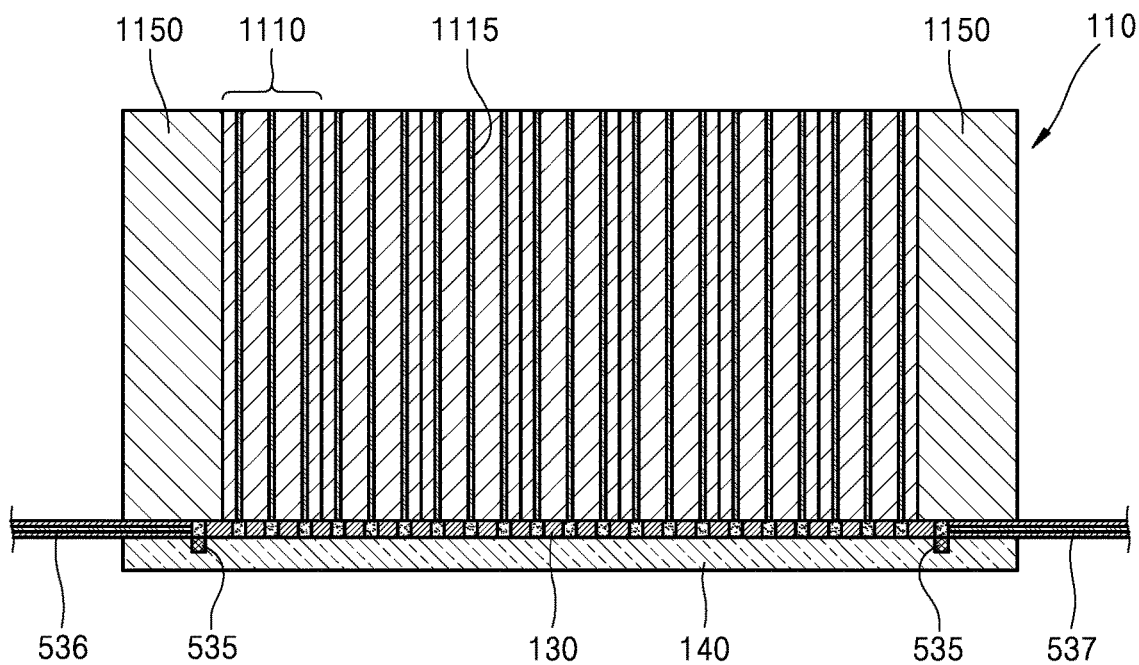
FIG. 10 is a schematic cross-sectional view of an electrical interconnection assembly according to an embodiment.

FIG. 10 is a schematic cross-sectional view of an electrical interconnection assembly according to an embodiment. Referring to FIG. 10, the outer boards 1150 are placed in outer portions of an interposer 110, and pattern wiring lines 536 and 537 are inserted into a bonding mask 130 such that second terminals 535, through which electrical signals are transmitted or received to or from the outside to supply power to the integrated circuit chip 140 and control the same, are electrically connected to the outside.

According to an embodiment, the second terminal that transmits or receives an electrical signal to or from the outside to supply power to the integrated circuit chip 140 and control the same may be exposed and connected to a flexible printed circuit board through wire bonding.

Figure 11:
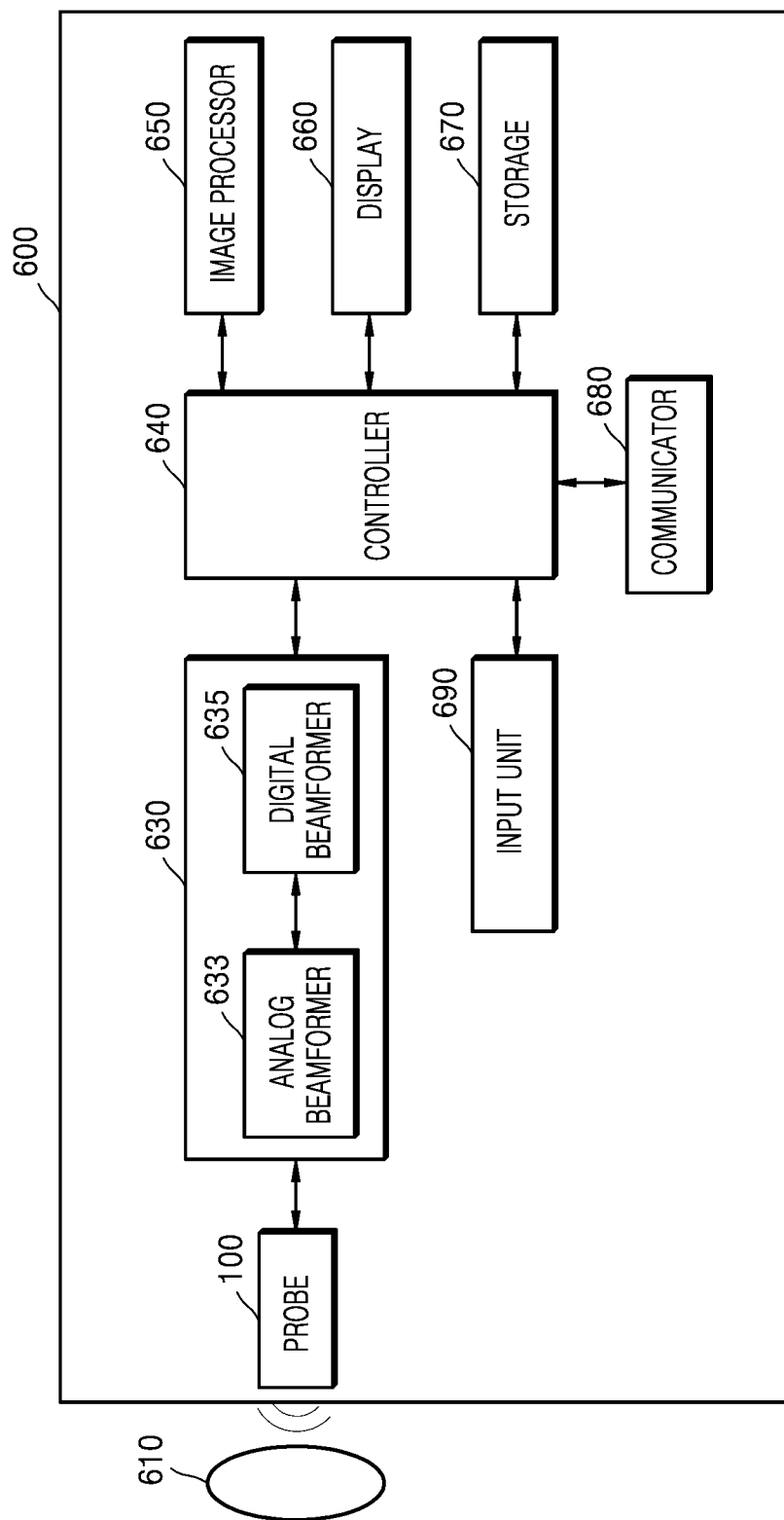
FIG. 11 is a structural block diagram of an ultrasound diagnostic apparatus according to an embodiment.

FIG. 11 is a structural block diagram of an ultrasound diagnostic apparatus 600 according to an embodiment. Referring to FIG. 11, the ultrasound diagnostic apparatus 600 includes an ultrasound probe 100, an ultrasound transmitter and receiver 630, i.e., a transceiver, a controller 640, an image processor 650, a display 660, an input unit 690, a storage 670, and a communicator 680.

The ultrasound probe 100 may be a 2D probe manufactured according to the above-described embodiments. The ultrasound transmitter and receiver 630 may include an analog beamformer 633 and a digital beamformer 635. While the ultrasound transmitter and receiver 630 and the ultrasound probe 100 are illustrated as separate elements in FIG. 11, the ultrasound probe 100 according to an embodiment may include some or all components of the ultrasound transmitter and receiver 630. For example, the ultrasound probe 100 may include at least one among the analog beamformer 633 and the digital beamformer 635.

The controller 640 may calculate a time delay value regarding digital beamforming of each of a plurality of sub-arrays included in a 2D transducer array. The controller 640 may calculate a time delay value regarding analog beamforming of each transducer included in one of the plurality of sub-arrays. The controller 640 may control the analog beamformer 633 and the digital beamformer 635 such that transmission signals to be respectively applied to the plurality of transducers are formed according to the time delay value for analog beamforming and the time delay value for digital beamforming. The controller 640 may control the analog beamformer 633 such that signals received from the plurality of transducers are summed according to each sub-array based on time delay values for analog beamforming. The controller 640 may control the ultrasound transmitter and receiver 630 such that the summed signals according to each sub-array are analog-to-digital converted. The controller 640 may control the digital beamformer 635 such that the digitally converted signals are summed according to a time delay value for digital beamforming to generate ultrasound data. The ultrasound probe 100 according to an embodiment may include some or all of components of the controller 640 according to an implementation form.

The image processor 650 generates an ultrasound image by using the ultrasound data.

The display 660 may display the ultrasound image and various types of information processed using the ultrasound diagnostic apparatus 600. The ultrasound diagnostic apparatus 600 may include one or a plurality of displays 660. The display 660 may be combined with a touch panel to be implemented as a touch screen and may provide an input and/or an output functionality.

The controller 640 may control an overall operation of the ultrasound diagnostic apparatus 600 and a signal flow between internal components of the ultrasound diagnostic apparatus 600. The controller 640 may include a program to perform functions of the ultrasound diagnostic apparatus 600 or a processor processing a program or data. The controller 640 may receive a control signal from the input unit 690 or an external device to control an operation of the ultrasound diagnostic apparatus 600.

The ultrasound diagnostic apparatus 600 includes the communicator 680, and may be connected to an external device (e.g., a server, a medical device, a portable device such as a smartphone, a tablet PC, a wearable device or the like) via the communicator 680.

The communicator 680 may include at least one component that allows communication with an external device, and may include, for example, at least one of a near field communication module, a wired communication module, and a wireless communication module.

The communicator 680 may transmit or receive a control signal and data to or from an external device.

The storage 670 may store various data or programs used in driving and controlling the ultrasound diagnostic apparatus 600, ultrasound data that is input or output, ultrasound images or the like.

The input unit 690 may receive a user input to control the ultrasound diagnostic apparatus 600. Examples of the user input may include an input for manipulating a button, a key pad, a mouse, a track ball, a jog switch, a knop or the like, a touch input for touching a touch pad or a touch screen, a voice input, a motion input, a biometric information input (e.g., iris recognition, fingerprint recognition, or the like) but are not limited thereto.

According to the ultrasound probe of the embodiment, the transducer elements in an outer portion and transducer elements in a center portion may be easily connected by using the interposer.

According to the method of manufacturing an interposer of the embodiments, the interposer may be manufactured by stacking printed circuit boards (PCBs), e.g., the circuit boards 1110, and the interposer may be easily connected to peripherals such as an integrated circuit chip, a connector, a cable or the like. Thus, manufacturing costs and process of the ultrasound probe may be reduced and simplified, and a simplified structure thereof may be achieved.

Embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. An interposer comprising:
a circuit board stack in which a plurality of circuit boards are stacked, the plurality of circuit boards being arranged next to one another to form a first side portion of the circuit board stack and comprise first conductive lines, each of the first conductive lines having a first end exposed through the first side portion of the circuit board stack and a second end exposed through a second side portion of the circuit board stack, the second side portion being opposite the first side portion; and
an outer board arranged on at least one of outer side surfaces of the circuit board stack, to form joined planes with a plane of the first side portion and a plane of the second side portion, respectively, the outer side surfaces of the circuit board stack extending between the first side portion and the second side portion,
wherein the outer board comprises second conductive lines, each of the second conductive lines having:
a first end exposed through a first side of the outer board that is different from the plane joined with the plane of the first side portion of the circuit board stack, and
a second end exposed through a second side of the outer board that is located on a same side as the plane joined with the second side portion of the circuit board stack.

2. The interposer of claim 1, wherein the plurality of circuit boards comprises a first guide portion, and the outer board comprises a second guide portion, and
the first guide portion and the second guide portion align the plurality of circuit boards and the outer board when stacking the plurality of circuit boards and the outer board.

3. The interposer of claim 2, wherein each of the first guide portion and the second guide portion comprises a guide hole or a guide groove.

4. The interposer of claim 1, further comprising:
a film configured to adjust a distance between the plurality of circuit boards and interposed between at least two of the plurality of circuit boards.

5. The interposer of claim 1, wherein the first ends of the second conductive lines are exposed through an outer side surface of the outer board, the outer side surface being the first side of the outer board.

6. The interposer of claim 1, wherein the first ends of the second conductive lines are exposed through the second side of the outer board.

7. An ultrasonic probe comprising:
piezoelectric elements; and
an integrated circuit chip electrically connected to the piezoelectric elements by the interposer of claim 1.

8. An ultrasound probe comprising:
a two-dimensional (2D) acoustic module comprising piezoelectric elements which are two-dimensionally arranged;
an integrated circuit chip; and
an interposer between the 2D acoustic module and the integrated circuit chip, the interposer comprising:
a circuit board stack in which a plurality of circuit boards are stacked, the plurality of circuit boards being arranged next to one another to form a first side portion of the circuit board stack and comprise first conductive lines, each of the first conductive lines having a first end exposed through the first side portion of the circuit board stack and a second end exposed through a second side portion of the circuit board stack, the second side portion being opposite the first side portion; and
an outer board arranged on at least one of outer side surfaces of the circuit board stack, to form joined planes with a plane of the first side portion and a plane of the second side portion, respectively, the outer side surfaces of the circuit board stack extending between the first side portion and the second side portion,
wherein the outer board comprises second conductive lines, each of the second conductive lines having:

a first end exposed through a first side of the outer board that is different from the plane joined with the plane of the first side portion of the circuit board stack, and a second end exposed through a second side of the outer board that is located on a same side as the plane joined with the second side portion of the circuit board stack, wherein the first ends of the first conductive lines are electrically connected to the piezoelectric elements, and the second ends of the first conductive lines and the second ends of the second conductive lines are electrically connected to the integrated circuit chip.

9. The ultrasound probe of claim 8, wherein the plurality of circuit boards comprises a first guide portion and the outer board comprises a second guide portion, and the first guide portion and the second guide portion align the plurality of circuit boards and the outer board when stacking the plurality of circuit boards and the outer board.

10. The ultrasound probe of claim 9, wherein each of the first guide portion and the second guide portion comprises a guide hole or a guide groove.

11. The ultrasound probe of claim 8, wherein the interposer further comprises:

a film that adjusts a distance between the plurality of circuit boards and is interposed between at least two of the plurality of circuit boards.

12. The ultrasound probe of claim 8, wherein the first ends of the second conductive lines are exposed through an outer side surface of the outer board, the outer side surface being the first side of the outer board.

13. The ultrasound probe of claim 8, wherein the first ends of the second conductive lines are exposed through the second side of the outer board.

14. The ultrasound probe of claim 8, wherein the interposer and the integrated circuit chip are bonded using a flip chip bonding method.

15. The ultrasound probe of claim 8, wherein the integrated circuit chip includes a surface-mount type package, and electrode terminals provided on a surface of the integrated circuit chip facing the interposer.

\* \* \* \* \*